(12) United States Patent
Tang

(10) Patent No.: US 11,671,870 B2
(45) Date of Patent: Jun. 6, 2023

(54) COMPRESSION PROCESSING METHOD, DECOMPRESSION PROCESSING METHOD AND RELATED DEVICES

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/411,622

(22) Filed: Aug. 25, 2021

(65) Prior Publication Data

US 2021/0385687 A1  Dec. 9, 2021

Related U.S. Application Data

(63) Continuation of application No. PCT/CN2019/080654, filed on Mar. 29, 2019.

(51) Int. Cl.
*H04W 28/06* (2009.01)
*H04L 1/1867* (2023.01)
*H04L 69/04* (2022.01)
*H04L 69/22* (2022.01)

(52) U.S. Cl.
CPC ........... *H04W 28/06* (2013.01); *H04L 1/1896* (2013.01); *H04L 69/04* (2013.01); *H04L 69/22* (2013.01)

(58) Field of Classification Search
CPC ... H04L 1/0079; H04L 1/1614; H04L 1/0008; H04W 80/02; H04W 28/06; H04W 72/1284; H04W 28/0278
See application file for complete search history.

(56) References Cited

U.S. PATENT DOCUMENTS 9,485,687 B2   11/2016  Yu
2005/0271066 A1  12/2005  Valadarsky
2006/0104266 A1*  5/2006  Pelletier .................. H04L 65/80
                                                          370/477
(Continued)

FOREIGN PATENT DOCUMENTS

CN       101453298 A    6/2009
CN       102025737 A    4/2011
(Continued)

OTHER PUBLICATIONS

3GPP TS 38.323 V16.2.0 (Sep. 2020):"Technical Specification Group Radio Access Network; NR; Packet Data Convergence Protocol (PDCP) specification (Release 16)".
(Continued)

*Primary Examiner* — Syed Ali
(74) *Attorney, Agent, or Firm* — Perkins Coie LLP

(57) ABSTRACT

A compression processing method, a decompression processing method and related devices are provided. The method includes: determining the state of an Ethernet packet header to be sent, and on the basis of the state of the Ethernet data packet header to be sent, processing data of the Ethernet packet header to be sent, wherein the state of the Ethernet packet header comprises at least one of the following: an uncompressed state and a compressed state.

3 Claims, 20 Drawing Sheets

(56) References Cited

U.S. PATENT DOCUMENTS

| | | | | |
|---|---|---|---|---|
| 2007/0299971 | A1* | 12/2007 | Mangetsu | H04L 67/06 709/225 |
| 2010/0142560 | A1* | 6/2010 | Sharivker | H04L 69/04 370/477 |
| 2010/0158146 | A1* | 6/2010 | Hamaguchi | H04L 5/0094 375/260 |
| 2013/0128808 | A1 | 5/2013 | Wentink et al. | |
| 2014/0143517 | A1* | 5/2014 | Jin | G06F 3/067 711/171 |
| 2018/0123757 | A1* | 5/2018 | Ko | H04L 69/18 |
| 2018/0367635 | A1* | 12/2018 | Li | H04L 12/66 |
| 2019/0014194 | A1 | 1/2019 | Chen et al. | |
| 2020/0288397 | A1* | 9/2020 | Ahn | H04W 52/0229 |
| 2021/0195524 | A1* | 6/2021 | Ahn | H04W 52/0229 |

FOREIGN PATENT DOCUMENTS

| | | |
|---|---|---|
| CN | 103369593 A | 10/2013 |
| CN | 103825869 A | 5/2014 |
| CN | 106416356 A | 2/2017 |
| EP | 1603304 A1 | 12/2005 |
| EP | 2854359 A2 | 4/2015 |
| EP | 2854359 A4 | 8/2015 |
| EP | 3419238 A1 | 12/2018 |
| JP | 2006148862 A | 6/2006 |
| WO | 2012159082 A2 | 11/2012 |

OTHER PUBLICATIONS

International Search Report in the international application No. PCT/CN2019/080654, dated Dec. 18, 2019.

3GPP TSG-RAN WG2 Meeting #104 R2-1816938, Spokane, USA, Nov. 12-16, 2018, Source: vivo, Title: Ethernet MAC header compression, Agenda Item: 11.7.2.3, Document for Discussion and Decision. 3 pages.

Supplementary European Search Report in the European application No. 19922297.7, dated Dec. 20, 2021. 11 pages.

Office Action of the Indian application No. 202117040888, dated Mar. 16, 2022. 6 pages with English Translation.

First Office Action of the Chinese application No. 202110944902.0, dated Sep. 16, 2022.

* cited by examiner

Non-compression order ◄——► Compression order

Figure 3A

No context state ⟵⟶ Context state

FIG. 4

First processing unit 61

FIG. 13

COMPRESSION PROCESSING METHOD, DECOMPRESSION PROCESSING METHOD AND RELATED DEVICES

CROSS-REFERENCE TO RELATED APPLICATIONS

The present disclosure is a U.S. continuation application of International Application No. PCT/CN2019/080654, filed on Mar. 29, 2019. The contents of the International Application No. PCT/CN2019/080654 is incorporated herein by reference in its entirety.

BACKGROUND

In the 5G New Radio (NR) system, in addition to supporting the Internet Protocol (IP), PDU session can also support Ethernet. That is, the PDU Session may not only be an IP packet type, but also be an Ethernet packet type. As shown in FIG. 1A, for the PDU layer, the type of the PDU Session is at least one of the following: IPv4, IPv6, and IPv4v6. That is, the packet corresponding to the PDU session is at least one of the following: an IPv4 packet, an IPv6 packet, and an IPv4v6 packet. When the type of the PDU Session is Ethernet, the PDU session corresponds to an Ethernet packet.

However, no related processing method has been proposed for the compression processing of the Ethernet packet in the PDU session. Therefore, transmission resources of the Ethernet packet may not be saved.

SUMMARY

The present disclosure relates to the technical field of information processing, and particularly, to a method of compression processing, a method of decompression processing, a compression side device, a decompression side device, and a computer storage medium, a chip, a computer readable storage medium, a computer program product, and a computer program.

In order to solve the above technical problems, the embodiments of the present disclosure provide a method of compression processing, a method of decompression processing, a compression side device, a decompression side device, and a computer storage medium, a chip, a computer readable storage medium, a computer program product, and a computer program.

In a first aspect, a method of compression processing is provided. The method includes the following operations.

A state of a to-be-transmitted Ethernet packet header is determined.

Data of the to-be-transmitted Ethernet packet header is processed based on the state of the to-be-transmitted Ethernet packet header.

The state of the Ethernet packet header includes at least one of the following: a non-compression order and a compression order.

In a second aspect, a method of decompression processing is provided. The method includes the following operations.

Ethernet data are received.

A decompression state is determined, and data of an Ethernet packet header is processed based on the decompressed state.

The decompression state includes at least one of the following: a no context state and a context state.

In a third aspect, a compression side device is provided. The device includes a first processing unit.

The first processing unit is configured to determine a state of a to-be-transmitted Ethernet packet header, and process, based on the state of the to-be-transmitted Ethernet packet header, data of the to-be-transmitted Ethernet packet header.

The state of the Ethernet packet header includes at least one of the following: a non-compression order and a compression order.

In a fourth aspect, a decompression side device is provided. The device includes a second communication unit and a second processing unit.

The second communication unit is configured to receive Ethernet data.

The second processing unit is configured to determine a decompression state, and process data of an Ethernet packet header based on the decompressed state.

The decompression state includes at least one of the following: a no context state and a context state.

In a fifth aspect, a compression side device is provided. The device includes a processor and a memory. The memory is configured to store computer programs, and the processor calls and runs the computer programs stored in the memory to perform the method of the first aspect or various implementations thereof.

In a sixth aspect, a decompression side device is provided. The device includes a processor and a memory. The memory is configured to store computer programs, and the processor is configured to call and run the computer programs stored in the memory to perform the method of the second aspect or various implementations thereof.

In a seventh aspect, a chip is provided. The chip is used for implementing the method of any one of the first aspect, the second aspect, or the implementations thereof.

Specifically, the chip includes a processor. The processor is configured to call and run computer programs from a memory to cause a device on which the chip is mounted performs a method as in any one of the first aspect, the second aspect, or various implementations thereof described above.

In an eighth aspect, a computer readable storage medium is provided. The computer readable storage medium is for storing computer programs. The computer programs cause a computer to perform the method of any one of the above-described first aspect, the second aspect, or various implementations thereof.

In a ninth aspect, a computer program product is provided. The computer program product includes computer program instructions. The computer program instructions cause a computer to perform the method of any one of the first aspect, the second aspect, or implementations thereof.

In a tenth aspect, a computer program is provided. When the computer program runs on a computer, the computer performs the method of any one of the first aspect, the second aspect, or implementations thereof described above.

BRIEF DESCRIPTION OF THE DRAWINGS

FIG. 3A is a first schematic diagram of a state transformation according to embodiments of the present disclosure.

FIG. 4 is a third schematic diagram of a state transformation according to embodiments of the present disclosure.

FIG. 13 is a schematic diagram of composition structure of a compression side device according to embodiments of the present disclosure.

DETAILED DESCRIPTION

By adopting the solutions in the present disclosure, when an Ethernet packet is transmitted and received, the packet header is compressed, and which manner needs to be performed for compression or decompression currently is determined according to different states, thereby solving the problem of how to compress Ethernet packet header and reducing the resource overhead of the air interface.

In order to understand the features and technical contents of the embodiments of the present disclosure in more detail, the implementation of the embodiments of the present disclosure will be described in detail with reference to the accompanying drawings, which are provided for the purposes of illustration only and are not intended to limit the embodiments of the present disclosure.

The technical solutions in the embodiments of the present disclosure will be described with reference to the accompanying drawings of the embodiments of the present disclosure. It will be apparent that the described embodiments are part of, but not all, embodiments of the present disclosure. Based on the embodiments in the present disclosure, all other embodiments obtained by a person of ordinary skill in the art without creative work fall within the scope of the present disclosure.

The technical solutions of the embodiments of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD), a Universal Mobile Telecommunication System (UMTS), a Worldwide Interoperability for Microwave Access (WiMAX) communication system, or a 5G system.

Figure 1A:
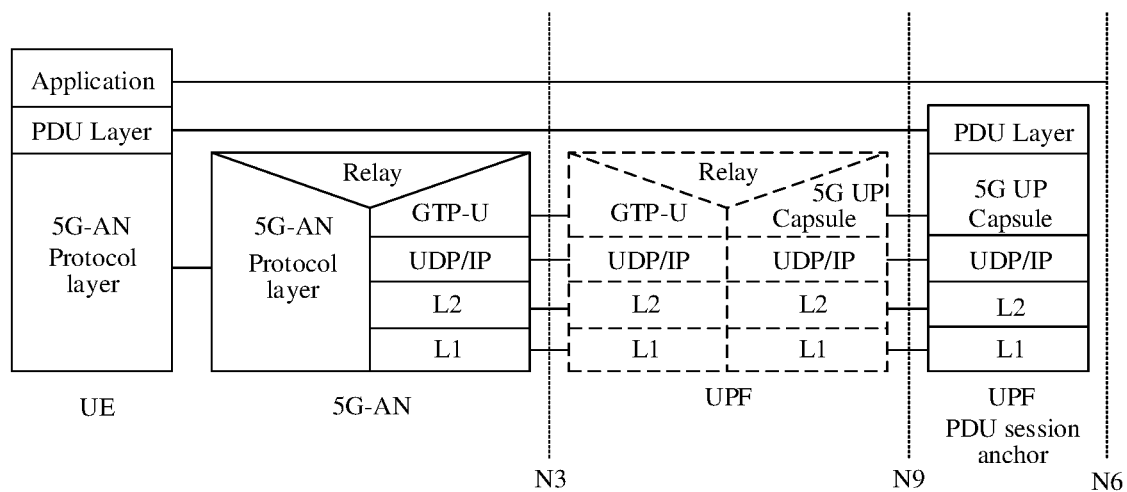
FIG. 1A is a schematic diagram of a system structure.
Figure 1B:
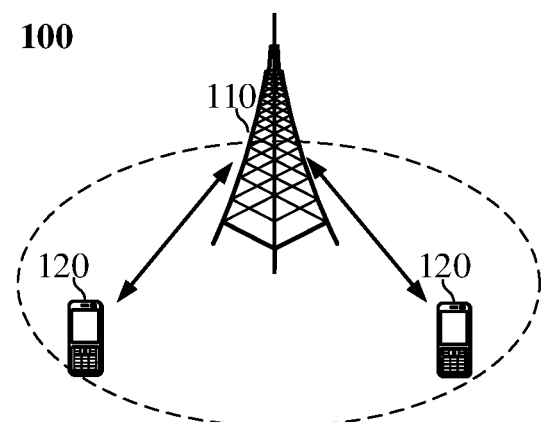
FIG. 1B is a first schematic diagram of a communication system architecture according to embodiments of the present disclosure.

Illustratively, a communication system 100 applied in the embodiments of the present disclosure may be shown in FIG. 1B. The communication system 100 may include a network device 110, which may be a device that communicates with terminal devices 120 (or referred to as a communication terminal, a terminal). The network device 110 may provide communication coverage for a particular geographic area and may communicate with terminal devices located within the coverage area. Alternatively, the network device 110 may be a Base Transceiver Station (BTS) in a GSM system or a CDMA system, a NodeB (NB) in a WCDMA system, an Evolutional Node B (eNB or eNodeB) in an LTE system, or a radio controller in a Cloud Radio Access Network (CRAN), or the network device may be a mobile switching center, a relay station, an access point, a vehicle-mounted device, a wearable device, a hub, a switch, a bridge, a router, a network-side device in a 5G network, a network device in a Public Land Mobile Network (PLMN), or the like.

The communication system 100 also includes at least one terminal device 120 located within coverage of the network device 110. As used herein, "terminal device" includes, but is not limited to, connections via wired lines, such as connection via a Public Switched Telephone Networks (PSTN), a Digital Subscriber Line (DSL), a digital cable, a direct cable connection, and/or another data connection/network and/or via a wireless interface, e.g., for cellular networks, Wireless Local Area Network (WLAN), digital television networks such as DVB-H networks, satellite networks, AM-FM broadcast transmitters, and/or apparatus of another terminal device configured to receive/transmit communication signals, and/or Internet of Things (IoT) devices. A terminal device configured to communicate through a wireless interface may be referred to as a "wireless communication terminal", "wireless terminal" or "mobile terminal".

Alternatively, Device to Device (D2D) communication may be performed between the terminal devices 120.

It should be understood that the terms "system" and "network" are used interchangeably herein. The term "and/or," as used herein, is merely an association that describes an associated object, meaning that there may be three relationships, e.g., A and/or B may represent three conditions: i.e., independent existence of A, existence of both A and B, and independent existence of B. In addition, the character "/" generally indicates that relationship between the associated objects is "or".

In order to understand the features and technical contents of the embodiments of the present disclosure in more detail, the implementation of the embodiments of the present disclosure will be described in detail with reference to the accompanying drawings, which are provided for the purposes of illustration only and are not intended to limit the embodiments of the present disclosure.

It should be noted that the number corresponding to any one English alphabet representing the number mentioned in the present disclosure may be the same or different. For example, the values of N and M may be same, or different. In addition, the number may be an integer greater than or equal to 1.

Figure 2A:
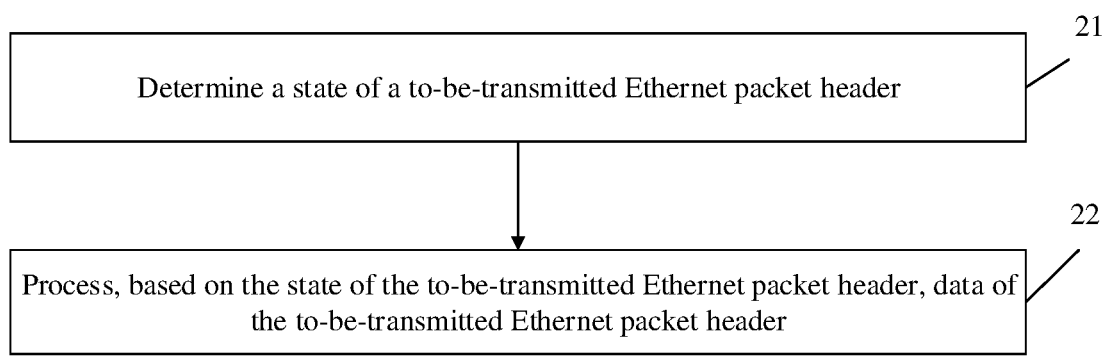
FIG. 2A is a flow schematic diagram of a method of compression processing according to embodiments of the present disclosure.

The embodiments of the present disclosure provide a method of compression processing. As shown in FIG. 2A, the method includes the following operations.

In operation 21, a state of a to-be-transmitted Ethernet packet header is determined.

In operation 22, data of the to-be-transmitted Ethernet packet header is processed based on the state of the to-be-transmitted Ethernet packet header.

The state of the Ethernet packet header includes at least one of the following: a non-compression order and a compression order.

The present embodiment may be applied to a transmitting device, such as a terminal device or a network device, and any one device that needs to perform data transmitting may be considered as the transmitting device described in the present embodiment.

The compression order in the present embodiment may include two situations: a compression order and a non-compression order. Alternatively, the compression order may be understood to include an initialization and Refresh (IR) state, i.e., the non-compression order.

Alternatively, the compression order includes at least one of the following: a compression order of part data and a compression order of all data.

That is, in the present embodiment, there may be two situations: the compression order and the non-compression order. There may also be three situations: the non-compression order, the compression order of part data and the compression order of all data. That is, they may be referred to as IR state, First order (FO), and Second order (SO), respectively. Here, the SO may be the compression order of all data, and the FO may be the compression order of part data.

It should be understood that after the operation 22 is performed, the method may also include transmitting the Ethernet packet including the processed Ethernet packet header.

In operation 21, the operation that determining the state of the to-be-transmitted Ethernet packet header includes determining whether the state changes, and determining the state of the to-be-transmitted Ethernet packet header.

Specifically, it may include the following operations.

The state of the to-be-transmitted Ethernet packet header is determined based on a first preset rule.

The first preset rule includes at least one of the following.

Performing state transformation between different states is determined based on a period.

Performing state transformation between different states is determined based on a timer.

When N packets of Ethernet packet headers in a same state are transmitted, transformation to another compression order is performed. N is an integer.

When acknowledgement information is received, transformation from a state to another state is performed.

When negative acknowledgement information is received, transformation from a state to another state is performed.

When a specific indication is received, transformation from a state to another state is performed.

That is, the compression order of the currently to-be-transmitted Ethernet packet header may be determined based on the first preset rule.

It should be noted that in the following description, the names of the head compression orders are given from front to back according to the different efficiencies (from low to high) of the head compression, representing the initialization state, the FO, and/or the SO.

Specifically, the operation that performing the state transformation between different states is determined based on a period may be that in the process, performing switching between a plurality of states may be determined based on a preset period, and then determining the state of the currently to-be-used Ethernet packet header. For example, for two states, referring to FIG. 3A, for the compression order and the non-compressed state, the compression order is used in the first period and the non-compression order is used in the next period. The state of the currently to-be-transmitted packet may be determined according to the current period. Alternatively, for the case of three states, the state of the to-be-transmitted packet may also be determined based on the current period.

The operation that performing a state transformation between different compression orders is determined based on the timer is similar to the above. Same or different timers may be set for different states. When the time length of the timer reaches a corresponding time length, a transformation from one state to another state is performed. For example, after reaching the time length, for the compression order, of the timer, transformation to a non-compression order is performed, and vice versa. The to-be-transmitted Ethernet packet header is controlled to be in a state, which is a state determined based on a timer currently.

The operation that transformation to another compression order is performed when the N packets of Ethernet packet headers in the same state are transmitted includes one of the following.

When N packets of the Ethernet packet headers in the non-compression order are transmitted, transformation from the non-compression order to the compression order is performed.

When the N packets of the Ethernet packet header in the non-compression order are transmitted, transformation from the non-compression order to the compression order of part data is performed.

When N packets of Ethernet packet headers in the compression order of part data are transmitted, transformation from the compression order of part data to the compression order of all data is performed.

When the N packets of Ethernet packet headers in the non-compression order are transmitted, transformation from the non-compression order to the compression order of all data is performed.

When N packets of Ethernet packet headers in the compression order are transmitted, transformation from the compression order to non-compression order is performed.

When N packets of Ethernet packet headers in the compression order of all data are transmitted, transformation from the compression order of all data to the non-compression order is performed.

When the N packets of Ethernet packet headers in the compression order of all data are transmitted, transformation from the compression order of all data to the compression order of part data is performed.

When the N packets of Ethernet packet headers in the compression order of part data are transmitted, transformation from the compression order of part data to the non-compression order is performed.

It should be noted that the above-mentioned transmission of N packets in a certain state may be understood as a consecutive transmission of N packets in a certain state or a discontinuous transmission of N packets in a certain state. It is generally to be the consecutive transmission of N packets of a certain state.

That is, when a plurality of packets of a certain state is transmitted, transformation to a next state is performed. When the original state is the non-compression order and there are two states, the next state may be the compression order. When there are three states, the next state may be the compression order of part data or the compression order of all data. Further, when the original state is the compression order, the next state may be a non-compression order. Alternatively, when there are three states and the original state is the compression order of all data, the next state is the compression order of part data or a non-compression order. In the case of the three states, there is another situation in which, when the original state is the compression order of part data, the next state may be the compression order of all data or a non-compression order. Specifically, the next state may be determined according to a preset protocol.

On the basis of the above, in the present embodiment, the manner for determining the state of the currently to-be-transmitted Ethernet packet header may be determining based on the state of the packet header in the at least one Ethernet packet that has been transmitted at present. For example, if the number of packets currently transmitted in one state is less than N, then the currently to-be-transmitted Ethernet packet is still transmitted in this state. If the number is equal to N, then the Ethernet packet header is processed by turning to adopting another state and the Ethernet packet is transmitted.

The operation that when the acknowledgement information is received, transformation from the state to another state is performed includes at least one of the following.

When M pieces of consecutive acknowledgement information are received, or

C pieces of acknowledgement information are received, transformation from the non-compression order to the compression order is performed.

When the M pieces of consecutive acknowledgement information are received, or the C pieces of acknowledgement information are received, transformation from the non-compression order to the compression order of part data is performed.

When the M pieces of consecutive acknowledgement information are received, or the C pieces of acknowledgement information are received, transformation from the compression order of part data to the compression order of all data is performed.

When the M pieces of consecutive acknowledgement information are received, or the C pieces of acknowledgement information are received, transformation from the non-compression order to the compression order of all data is performed.

M and C are both integers greater than or equal to 1.

M and C may be same or different. For example, M may be smaller than C. That is, when it is determined that the acknowledgement information is consecutively received, a less number of the pieces of the received information is enough to determine whether to perform the state transformation. When the acknowledgement information is discontinuously received, that is, there may be negative acknowledgement information existed among the acknowledgement information. In such case, more pieces of discontinuous acknowledgement information may be received before whether to perform the state transformation is determined. Of course, vice versa, for example, M may be greater than C, and the specific details may be determined according to the protocol between the two parties.

Specifically, the Ethernet packet header is originally processed by adopting the non-compression order. When M pieces of consecutive acknowledgement information for the packets are received, or the C pieces of discontinuous acknowledgement information for the packets are received, the Ethernet packet header is processed by turning to adopting the compression order. When there are three states, the Ethernet packet header may be processed by turning to adopting the compression order of part data and the compression order of all data.

For another example, the Ethernet packet header is originally processed by adopting the compression order. When M pieces of consecutive acknowledgement information for the packets are received, or the C pieces of discontinuous acknowledgement information for the packets are received, and the Ethernet packet header is processed by turning to adopting the non-compression order.

For another example, the Ethernet packet header is originally processed by adopting the compression order of part data. When M pieces of consecutive acknowledgement information for the packets are received, or C pieces of discontinuous acknowledgement information for the packets are received, the Ethernet packet header is processed by turning to adopting the compression order of all data or the non-compression order. Alternatively, the Ethernet packet header is originally processed by adopting the compression order of all data. When M pieces of consecutive acknowledgement information for the packets are received, or C pieces of discontinuous acknowledgement information for the packets are received, the Ethernet packet header is processed by turning to adopting the compression order of part data or the non-compression order.

The state of the currently to-be-transmitted Ethernet packet header may be determined in combination with the original state and the received acknowledgement information. For example, the compression order is currently adopted, and when the number of the pieces of the received consecutive acknowledgement information is less than M, or the number of the pieces of the received discontinuous acknowledgement information is less than C, the packet header is processed without changing the current state. Otherwise, processing is performed by adopting the non-compression order. Other scenarios are similar and will not be exhaustive here.

In another situation, when migrating to the high compression order based on the acknowledgement information, two types of acknowledgement information (ACK) feedback or three types of ACK feedback may be adopted. Two types of acknowledgement information and three types of acknowledgement information are respectively described below.

The processing manner for two types of acknowledgement information is described in the following.

When a first number of ACKs of first type is received, migration from the non-compression order or the compression order of part data to the compression order of all data may be performed. When a second number of ACKs of second type is received, migration from the non-compression order to the compression order of part data may be performed. That is, the ACK of the first type is used for triggering a state migration to a state of highest efficiency, and the ACK of the second type is used for triggering a state migration to a state of higher efficiency. The first number and the second number may be same or different, and both are an integer greater than or equal to 1.

The processing manner for three types of acknowledgement information is described in the following.

When a third number of ACK of the first type is received, transformation from the non-compression order to the compression order of all data may be performed.

When a fourth number of ACK of the second type is received, transformation from compression order of part data to a compression order of all data may be performed.

When a fifth number of ACK of a third type is received, transformation from the non-compression order to the compression order of part data may be performed.

That is, in the present processing manner, the ACK of the first type is used for triggering the migration to the compression order of all data. The ACK of the second type is used for triggering the migration from the compression order of part data to the compression order of all data. The ACK of the third type is used for triggering the migration from the non-compression order to the compression order of part data of higher efficiency.

Similarly, in the present processing manner, the third number, the fourth number, and the fifth number are integers greater than or equal to 1, and may be different.

It should also be noted that in the above two processing manners, the number of the pieces of the received ACK may be different from the number of transmitted Ethernet headers. For example, when N Ethernet packets are transmitted, the number of the pieces of the received ACK may be less than or equal to N.

The operation that transformation from a state to another state is performed when the negative acknowledgement information is received includes one of the following.

When K pieces of consecutive negative acknowledgement information are received, or L pieces of negative acknowledgement information are received, transformation from the compression order of all data to the compression order of part data is performed.

When the K pieces of consecutive negative acknowledgement information are received, or the L pieces of negative acknowledgement information are received, transformation from the compression order of all data to the non-compression order is performed.

When the K pieces of consecutive negative acknowledgement information are received, or the L pieces of negative acknowledgement information are received, transformation from the compression order of part data to the non-compression order is processed.

When the K pieces of consecutive negative acknowledgement information are received, or the L pieces of negative acknowledgement information are received, transformation from the compression order to the non-compression order is processed.

K and L are integers greater than or equal to 1.

K and L may be same or different.

Specifically, the Ethernet packet header is originally processed by adopting the non-compression order. When K pieces of consecutive negative acknowledgement information for the packets are received or L pieces of discontinuous negative acknowledgement information for the packets are received, the Ethernet packet header is processed by turning to adopting the compression order. When there are three states, the Ethernet packet header is processed by turning to adopting the compression order of part data or compression order of all data.

For another example, the Ethernet packet header is originally processed by adopting the compression order. When K pieces of consecutive negative acknowledgement information for the packets are received or L pieces of discontinuous negative acknowledgement information for the packets are received, the Ethernet packet header is processed by turning to adopting the non-compression order.

For another example, the Ethernet packet header is originally processed by adopting the compression order of part data. When K pieces of consecutive negative acknowledgement information for the packets are received or L pieces of discontinuous negative acknowledgement information for the packets are received, the Ethernet packet header is processed by turning to adopting compression order of all data or the non-compression order. Alternatively, the Ethernet packet header is originally processed by adopting the compression order of all data. When K pieces of consecutive negative acknowledgement information for the packets are received or L pieces of discontinuous negative acknowledgement information for the packets are received, the Ethernet packet header is processed by turning to adopting the compression order of part data or the non-compression order.

The state of the currently to-be-transmitted Ethernet packet header may be determined in combination with the original state and the received acknowledgement information. For example, the compression order is currently used, and when the number of the pieces of the received consecutive negative acknowledgement information is less than K, or the number of the pieces of the received discontinuous negative acknowledgement information is less than L, the packet header is processed without changing the current state. Otherwise, processing is performed by adopting the non-compression order. Other scenarios are similar and will not be exhaustive here.

The operation that transformation from a state to another state is performed when the negative acknowledgement information is received includes at least one of the following.

When A pieces of negative acknowledgement information of a first type are received, or F pieces of consecutive negative acknowledgement information of the first type are received, transformation from the compression order of all data to the compression order of part data is performed. A and F are integers greater than or equal to 1.

When A pieces of negative acknowledgement information of the first type are received, or F pieces of consecutive negative acknowledgement information of the first type are received, transformation from the compression order of part data to the non-compression order is performed.

When A pieces of negative acknowledgement information of the first type are received, or the F pieces of consecutive negative acknowledgement information of the first type are received, transformation from the compression order to the non-compression order is performed.

When B pieces of negative acknowledgement information of a second type are received, or E pieces of consecutive negative acknowledgement information of the second type are received, transformation from the compression order of all data to the non-compression order is performed.

When the B pieces of negative acknowledgement information of the second type are received, or the E pieces of consecutive negative acknowledgement information of the second type are received, transformation from the compression order of part data to the non-compression order is performed.

When the B pieces of negative acknowledgement information of the second type are received, or E pieces of consecutive negative acknowledgement information of the second type are received, transformation from the compression order to the non-compression order is performed.

When G pieces of negative acknowledgement information of a third type are received, or P pieces of consecutive negative acknowledgement information of the third type are received, transformation from the compression order of all data to the non-compression order is performed. Both G and P are integers.

When the G pieces of negative acknowledgement information of the third type are received, or the P pieces of consecutive negative acknowledgement information of the third type are received, transformation from the compression order of part data to the non-compression order is performed.

When the G pieces of negative acknowledgement information of the third type are received, or the P pieces of consecutive negative acknowledgement information of the third type are received, transformation from the compression order to the non-compression order is performed.

The negative acknowledgement information of the first type, the negative acknowledgement information of the second type and the negative acknowledgement information of the third type are different from each other.

It should be noted here that the above branches may be combined in different situations. That is, the negative acknowledgement information of the first type, the negative acknowledgement information of the second type and the negative acknowledgement information of the third type may be different in different situations.

For example, the negative acknowledgment information of the first type is used for feedback corresponding to the compression order of all data, and accordingly, it is able to control the transformation of compression order of all data to the non-compression order or to control the transformation of the compression order to the non-compression order. The negative acknowledgement information of the second type is used for feedback corresponding to the compression order of part data, and accordingly, it is able to cause the sending end transforms the compression order of part data to the non-compression order. The non-acknowledgment information of the third type is used for feedback corresponding to the compression order of all data, and accordingly, it is able to cause the sending end transforms the compression order of all data to the compression order of part data.

Alternatively, only two types of negative acknowledgement information are adopted. The first type of negative acknowledgement information is used for feedback of the compression order of all data, and accordingly, the sending end is able to transform compression order of all data to non-compression order. Alternatively, the first type of negative acknowledgement information is used for the feedback of the compression order of all data, and accordingly, the sending end transforms the compression order of all data to the compression order of part data. The second type of negative acknowledgement information is used for the feedback of the compression order of part data, and accordingly, the sending end transforms the compression order of part data to the non-compression order.

Alternatively, only two types of non-acknowledgment information are adopted. The first type of non-acknowledgment information is used for feedback of the non-compression order, and accordingly, the sending end can transform the compression order of all data or the compression order to the non-compression order. The second type of non-acknowledgment information is used for the feedback to the compression order of part data, and accordingly, the sending end transforms the compression order of all data to the compression order of part data.

Alternatively, three types of non-acknowledgment information are adopted. The first type of non-acknowledgment information is used for the feedback of compression order of all data, and accordingly, the sending end can transform compression order of part data to the non-compression order or compression order of all data. The second type of non-acknowledgment information is used for the feedback of the non-compression order, and accordingly, the sending end can transform the non-compression order to the compression order or the compression order of part data. The third type of non-acknowledgment information is used for the feedback of the compression order of part data, and accordingly, the sending end can transform the compression order of part data to the non-compression order or the compression order of all data.

Of course, there may be other combinations. In general, different types of non-acknowledgment information may correspond to different states or may correspond to different state transformations. It should be understood that the state transformation for the non-acknowledgment information is the transformation to a state of lower efficiency or lowest efficiency.

Accordingly, the sending end, when determining the state of itself, may determine the state to be adopted at present according to the original state and the situation in which the first type of negative acknowledgement information, the second type of negative acknowledgement information, or the third type of negative acknowledgement information are received.

For example, if the initial state is the compression order of part data, the transformation from the compression order of part data to the non-compression order is performed when B pieces of consecutive second type of negative acknowledgement information are received or E pieces of discontinuous second type of negative acknowledgement information are received.

It should be understood that the scenario may also be further processed in combination with a period or timer. For example, when the initial state is a non-compression order, and when the period length is satisfied, transformation to another state is performed, such as transforming to the compression order or the compression order of all data or the compression order of part data. For another example, when the initial state is the non-compression order and the time length of the timer is satisfied, transformation to another state is performed for example, transformation to the compression order or the compression order of all data or the compression order of part data is performed.

With respect to the operation that transformation is performed from one state to another state when a specific indication is received, a corresponding indication may be sent by a receiving end to determine to transform to which state based on the contents of the indication. For example, when the initially sent packet is in the compression order, a specific indication fed back by the receiving end is received, and the indication content is transforming to the non-compression order, the transformation is performed based on the indication. That is, when the compression situation of the currently to-be-transmitted packet header is determined, it is determined that the transmission is performed based on the state after the transformation of the specific indication. Alternatively, when it is in the compression order of part data currently, transformation to the compression order of all data is determined according to the specific indication, or transformation to the non-compression order is determined according to the specific indication.

It should also be noted that the specific indication may also be processed in combination with the rules, such as above acknowledgement information or negative acknowledgement information and a timer, and the like. For example, when the third type of non-acknowledged information is currently received, it is necessary to transform from the compression order of all data in the initial state to the non-compression order, and receive a specific indication at the same time. The content of the specific indication is transforming from the compression order of all data in the initial state to the compression order of part data. At this time, how to process may be determined according to the priorities of the preset various rules. For example, the priority of the specific indication is higher, and the state may be transformed to the compression order of part data based on the content of the specific indication.

Figure 3B:
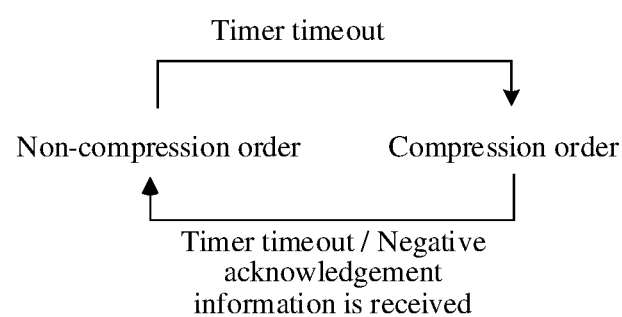
FIG. 3B is a second schematic diagram of a state transformation according to embodiments of the present disclosure.

In the above embodiments, the state transformation of the Ethernet packet header is described with reference to the state transformation between the two states, i.e., the non-compression order and the compression order, shown in the FIG. 3B. The state transformation from the non-compression order to the compression order may be a state transformation triggered by the rule of timer timeout. It should be understood that, although not illustrated in the figure, the state transformation may actually be initiated by the various rules, and the description will not be repeated here. Transformation from the compression order to the non-compression order may be triggered by timer timeout. The figure also shows that it may be triggered by receiving negative acknowledgement information (NACK). The receiving the NACK may be receiving a plurality of pieces of NACK or receiving a plurality of pieces of NACK consecutively. Similarly, although state transformation triggered by other rules are not illustrated in the figure, it may actually be initiated by other rules, such as it may be triggered periodically, or it may be triggered by receiving indication, etc., as described in the above embodiments, and will not be described herein again.

Figure 2B:
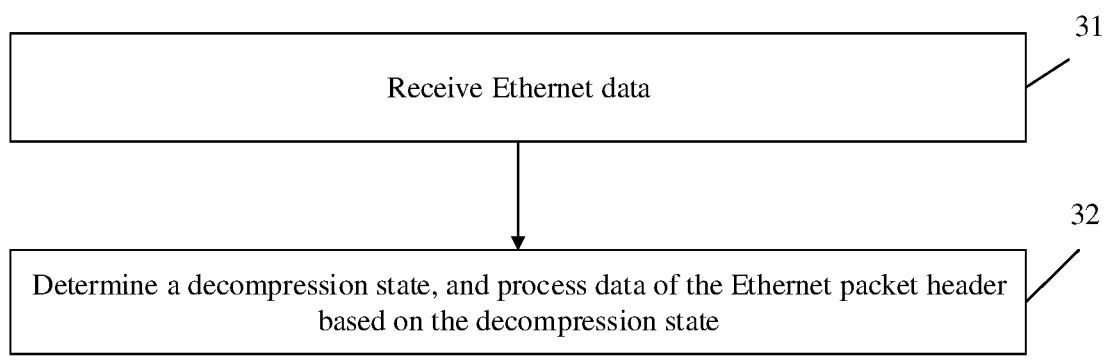
FIG. 2B is a schematic diagram of a flow of a method of decompression processing according to embodiments of the present disclosure.

In another embodiment, a method of decompression processing for a receiving device, referring to FIG. 2B, includes the following processing operations.

In operation 31, Ethernet data is received.

In operation 32, a decompression state is determined, and data of the Ethernet packet header is processed based on the decompression state.

The decompression state includes at least one of the following: a no context state and a context state.

The context state includes at least one of the following: a static context state and a full context state.

Here, it should be noted that the decompression state may correspond to the above states, and there may be two or three decompression states. When there are two decompression states, the no context state may be a state that does not need to be decompressed, and the context state may be a state that needs to be decompressed.

In addition, when there are three decompression states, they may include the no context state, the static context state and a full context state. Here, similarly, the no context state may be the state that does not need to be decompressed, the static context state may be a state that part needs to be decompressed, and the full context state may be a state that all needs to be decompressed.

The process of determining the decompression state may include determining whether the state is changed.

The process of determining the decompression state may be performed according to a preset rule. That is, corresponding to the sending end, a second preset rule for decompression corresponding to the compression are provided, which may specifically include the following.

The decompression state is determined based on the second preset rule.

The second preset rule includes at least one of the following.

Performing state transformation between different decompression states is determined based on a period.

Performing state transformation between different decompression states is determined based on a timer.

When H packets in a same decompression state are received or received consecutively, transformation to another decompression state is performed. H is an integer.

When W packets of a first type are received or received consecutively, transformation from a decompression state to another decompression state is performed. W is an integer.

When R packets of a second type are received or received consecutively, transformation from a decompression state to another decompression state is performed. R is an integer, and the first type is different from the second type.

When Q packets of a third type are received or received consecutively, transformation from a decompression state to another decompression state is performed. Q is an integer, and the third type, the first type and the second type are different from each other.

When a migration indication is received, transformation of the decompression state is performed based on the migration indication.

When packet decompression fails in one decompression state, transformation to another decompression state is performed.

When a particular packet or indication is transmitted, performing the state transformation between different decompression states is determined.

Figure 4:
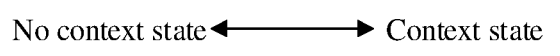

Specifically, the operation that performing state transformation between different decompression states is determined based on a period may be that in the process, performing transformation between a plurality of decompression states is determined based on a preset period, so that the state of the currently to-be-used Ethernet packet header may be determined. For example, for two states, referring to FIG. 4, for the no context state and the context state, the no context state is used in a first period and the context state is used in the next period. The decompression state of the currently to-be-used packet may be determined according to the current period. Alternatively, for the three states, the decompression state may also be determined based on the current period.

The operation that performing a state transformation between different decompression states is determined based on the timer is similar to the above. It may be that: same or different timers are set for different states, and when the time length of the timer reaches a corresponding time length, a transformation from one decompression state to another decompression state is performed. For example, after reaching the time length of the timer for the context state, transformation to the no context state is performed, and vice versa. The to-be-transmitted Ethernet packet header is controlled to be in a state, which is a state determined based on a timer currently.

The operation that when H packets in the same decompression state are received or received consecutively, transformation to another decompression state is performed. H is an integer and includes at least one of the following.

When H packets in the no context state are received or received consecutively, transformation from the no context state to the context state is performed.

When H packets in the no context state are received or received consecutively, transformation from the context state to the no context state is performed.

When H packets in the no context state are received or received consecutively, transformation from the no context state to the static context state is performed.

When H packets in the no context state are received or received consecutively, transformation from the no context state to the full context state is performed.

When H packets in the static context state are received or received consecutively, transformation from the static context state to the full context state is performed.

When H packets in the full context state are received or received consecutively, transformation from the full context state to the no context state is performed.

When H packets in the full context state are received or received consecutively, transformation from the full context state to the static context state is performed.

When H packets in the static context state are received or received consecutively, transformation from the static context state to the no context state is performed.

It should be noted that the above-mentioned reception of H packets in any state may be understood as a consecutive reception of H packets in a certain decompression state or a discontinuous reception of H packets in the certain decompression state. It is generally to be the consecutive reception of H packets in a certain state.

That is, when a plurality of packets in a certain decompression state is received, transformation to a next decompression state is performed. When the original state is the no context state and there are two states, the next state may be the context state. When there are three states, the next state may be the static context state, or full context state. Further, when the original state is a full context state, the next state may be the static context state. Alternatively, when there are three states and the original state is the full context state, the next state is the static context state or no context state. In the case of three states, there is another situation in which, when the original state is the static context state, the next state may be the no context state or the full context state. Specifically, the next state may be determined according to a preset protocol.

On the basis of the above, in the present embodiment, the current decompression state may be determined based on the decompression state of at least one currently received packet. For example, if the number of packets processed in the current decompression state is less than H, then the decompression state is still used for processing. If the number is equal to or greater than H, then the Ethernet packet header is processed by turning to adopting the other decompression state.

The operation that transformation from the decompression state to another decompression state is performed when W packets of the first type are received or received consecutively includes at least one of the following.

When W packets of the first type are received or received consecutively, transformation from the no context state to the context state is performed.

When W packets of the first type are received or received consecutively, transformation from the no context state to the static context state is performed.

When W packets of the first type are received or received consecutively, transformation from the no context state to the full context state is performed.

When W packets of the first type are received or received consecutively, transformation from the static context state to the full context state is performed.

The operation that transformation from a decompression state to another decompression state is performed when R packets of the second type are received or received consecutively includes at least one of the following.

When R packets of the second type are received or received consecutively, transformation from the context state to the no context state is performed.

When R packets of the second type are received or received consecutively, transformation from the static context state to the no context state is performed.

When R packets of the second type are received or received consecutively, transformation from the full context state to the no context state is performed.

When R packets of the second type are received or received consecutively, transformation from the full context state to the static context state is performed.

In addition, the operation that transformation from a decompression state to another decompression state is performed when Q packets of the third type are received or received consecutively includes at least one of the following.

When Q packets of the third type are received or received consecutively, transformation from the context state to the no context state is performed.

When Q packets of the third type are received or received consecutively, transformation from the static context state to the no context state is performed.

When Q packets of the third type are received or received consecutively, transformation from the static context state to the full context state.

It should be noted here that the above branches may be combined in different situations. That is, packets of the first type, packets of the second type and packets of the third type may be different in different situations.

For example, the packet of the first type may be a packet in the non-compression order. When a plurality of packets of the first type are received or received consecutively, the packet may be transformed by the compression side to a packet in the compression order. Accordingly, transformation from the no context state to the context state is performed. Alternatively, when there are three states, transformation from the no context state to the static context state is performed, or transformation from no context state to full context state is performed. Alternatively, the packet of the first type may be a packet in the non-compression order. When a plurality of packets of the first type are received or received consecutively, the packet may be transformed by the compression side to a packet of the non-compression order. Accordingly, transformation from the context state to the no context state is performed. Alternatively, when there are three states, transforming from the full context state to the static context state is performed, or transformation from the full context state to the no context state is performed.

Alternatively, the packet of the second type may be a packet in the compression order. When a plurality of packets of the second type are received or received consecutively, the packet may be transformed by the compression side to the non-compression order. Accordingly, the decompression side needs to transform the state to no context state. When there are three decompression states, compression side may transform from the compression order to the compression order of part data. Accordingly, the decompression side may transform the state to static context state. Alternatively, the compression side may transform to the non-compression order. Accordingly, the decompression side transforms the decompression state to no context state.

A third type of packet may be understood as the compression order of part data at the compression side. When a plurality of packets of the third type are received or received consecutively, the compression side may transform to the compression order of all data. Accordingly, the decompression side needs to transform the state to the full context state. Alternatively, the compression side may transform to the non-compression order. Accordingly, the decompression side may transform the state to the no context state.

The operation that the decompression state is migrated based on the migration indication when the migration indication is received may include that the decompression state to be adopted by the receiving end may be indicated by the sending end. This situation may vary based on the sender end. That is, the sender end indicates, according to its own state, the decompression state, which is to be adopted for processing, is received. The indication may be sent when the state transformation occurs for the sending end, or may be sent through the feedback information when the transmitted request information is received. Alternatively, every time when the data is sent, an indication of a corresponding decompression state may be sent with the data.

The above operation that transformation to another decompression state is performed when packet decompression fails in one decompression state may be understood as a migration to a lower state. For example, when decompression fails in the full context state, the decompression may be performed by turning to the static context state. If it fails again, the decompression may be performed by turning to the no context state. Of course, it may also be migrated to a high state. For example, when decompression fails in the no context state, decompression may be performed by turning to the static context state, or full context state.

It should be further noted that, corresponding to the sending end, the receiving end may determine the migration of the decompression state when sending or consecutively sending a plurality of pieces of acknowledgement information, i.e., processing packets in a certain decompression state consecutively and successfully. For example, it may migrate to a higher state, for example, transforming from the no context state to the full context state, or the static context state. Alternatively, it may transform from the static context state to the full context state.

Alternatively, when the receiving end sends or consecutively sends a plurality of pieces of negative acknowledgement information, that is, when processing a plurality of packets in a certain decompression state fails, the receiving end may determine the migration of the decompression state. For example, it may migrate to a lower state, for example, transforming from the context state to the no context state. Alternatively, it may transform from the full context state to the static context state, or transform from the full context state to the no context state. It may also transform from the static context state to the no context state.

Figure 5:
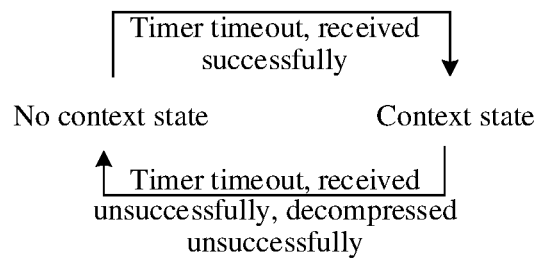
FIG. 5 is a fourth schematic diagram of a state transformation according to embodiments of the present disclosure.

FIG. 5 illustrates that in the case of two decompression states, the two decompression states may transform to each other. In a case of the timer timeout for the no context state, transformation to the context state is performed, or when a plurality of packets are received or successfully received in the no context state, transformation to the context state is performed. Of course, and the state transformation may be controlled according to a combination of one or more rules of the above second preset rule. When being in the context state, transformation to the no context state may be performed when timer timeout, or packets are not successfully received, or decompression of the packets fails. Similarly, the state transformation may be controlled according to a combination of one or more rules of the second preset rule, and details are not described herein. Although FIG. 5 only illustrates the transformation between two states, the transformation among the three states is similar and will not be shown again.

The following provides the description of a plurality of scenarios by taking an example of the sending end being a terminal device performing uplink data transmission and the receiving end being a network device performing uplink data reception. Specifically, in the description of the subsequent scenarios, the terminal device may be a user equipment (UE), and the network device may be a base station at the network side. It should be understood that in another situation, the sending end may be a network device and the receiving end may be a terminal device. In such a case, the downlink data transmission and reception are performed. Regardless of which device is used as the sending end or the decompression side device, the processing manner is the same, but no more exhaustive will be made in the present embodiment.

Scenario 1.

Figure 6:
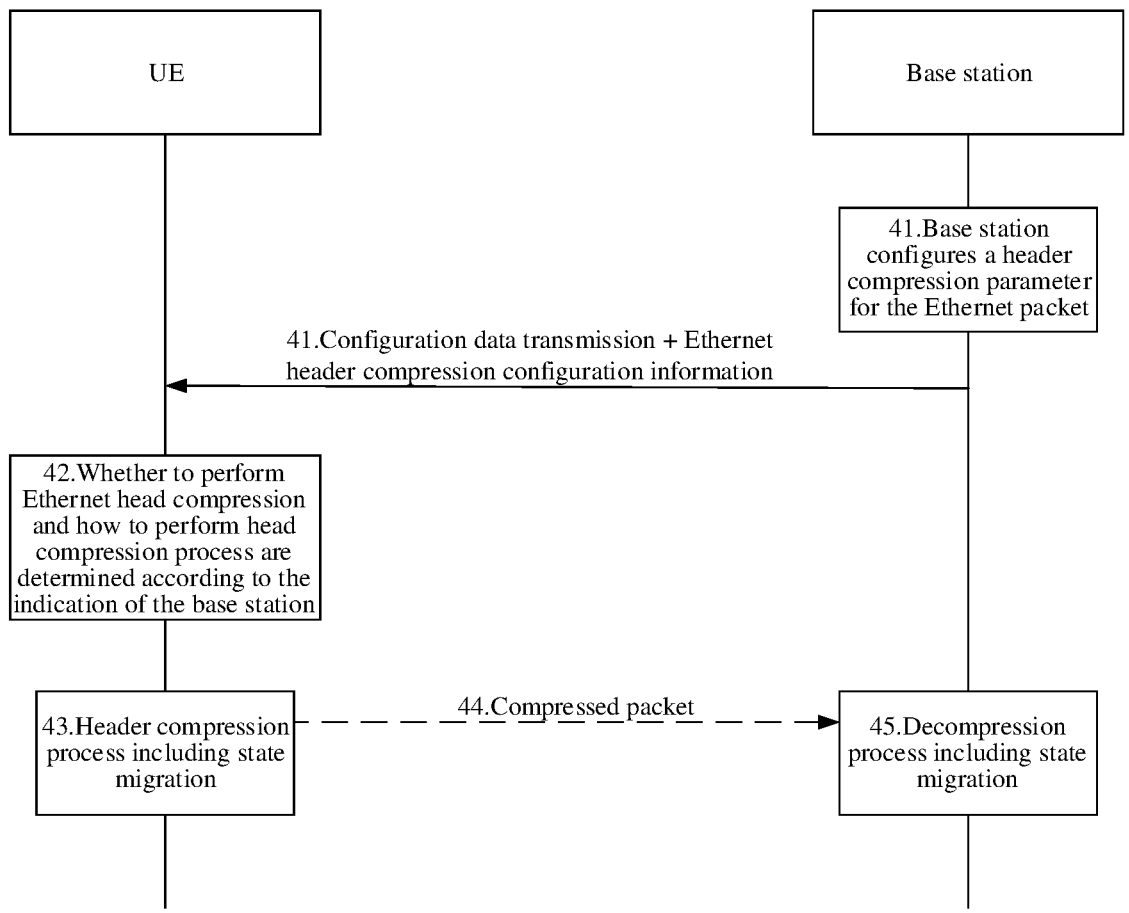
FIG. 6 is a first schematic diagram of a processing flow according to embodiments of the present disclosure.

Referring to FIG. 6, the process is as follows.

In operation 41, the base station configures a header compression parameter for the Ethernet packet. Configuration data transmission is performed through an RRC message, and an Ethernet packet header compression configuration is configured for the UE. That is, the indication may include an indication of whether the head is compressed, and a manner of head compression.

In operation 42, the UE determines, according to the indication of the base station, whether to perform head compression and how to perform head compression.

The UE determines, based on the Ethernet packet header compression configuration information transmitted by the base station, whether to perform Ethernet header compression and which sub-header/sub-header type to perform header compression, or the like.

For example, header compression may be performed on only part of the field:

DESTINATION ADDRESS, SOURCE ADDRESS, TYPE/LENGTH, Q-TAGs (including all sub-fields).

For another example, header compression processing is performed on a static or unchanged portion of an Ethernet packet header. The specific object or field or field type for header compression may be pre-written in the protocol, or may be indicated in the RRC configuration.

Compressible fields may be classified.

Static field types, includes, but not limited to at least one of the following: DESTINATION ADDRESS, SOURCE ADDRESS, TYPE/LENGTH, Q-TAGs (including all sub-fields).

Variable field types, includes, but not limited to at least one of the following: TYPE, PRI/PCP, CFI/DEI.

It should be noted that in most cases, all field in the compressible Ethernet header may belong to the static type, such as MAC address, Q-Tags, Type/length.

In operation 43, UE performs, based on the above operations, an operation of header compression, which includes state migration.

The specific state transformation may be selected as follows.

The initial head compression order is the non-compression order or the IR state.

At the start of the start of the header compression function, or at the initial moment, the UE (compression end) is in the non-compression order or the IR state, and the UE transmits a non-compressed Ethernet packet.

It should be noted that information carried in a format of the Ethernet packet header includes at least one of the following: Ethernet packet frame header compression identification, context identification, frame check sequence (FCS)/identification, indication of whether the header is compressed, sequence number (SN), cyclic redundancy code check (CRC), uncompressed field/sub-header identification, and uncompressed field/sub-header indication.

The format of the Ethernet packet header is: the packet in the compression order and the packet in the non-compression order are in different formats, i.e., independent packet format. That is, different types of packets adopt different packet formats. For example, at least one format of a packet that performs Ethernet packet header compression and a format of packet of non-compressed (containing complete packet information) Ethernet frame are defined, and/or the packet in the compression order and the packet in the non-compression order are in a same format, and values of identification bits of the packets in the compression order being different from values of identification bits of the packets in the non-compression order by at least one bit, That is, the formats of the packets are uniform. The packet in the compression order and the packet in the non-compression order (containing the complete packet information) adopt the same packet format.

Figure 7:
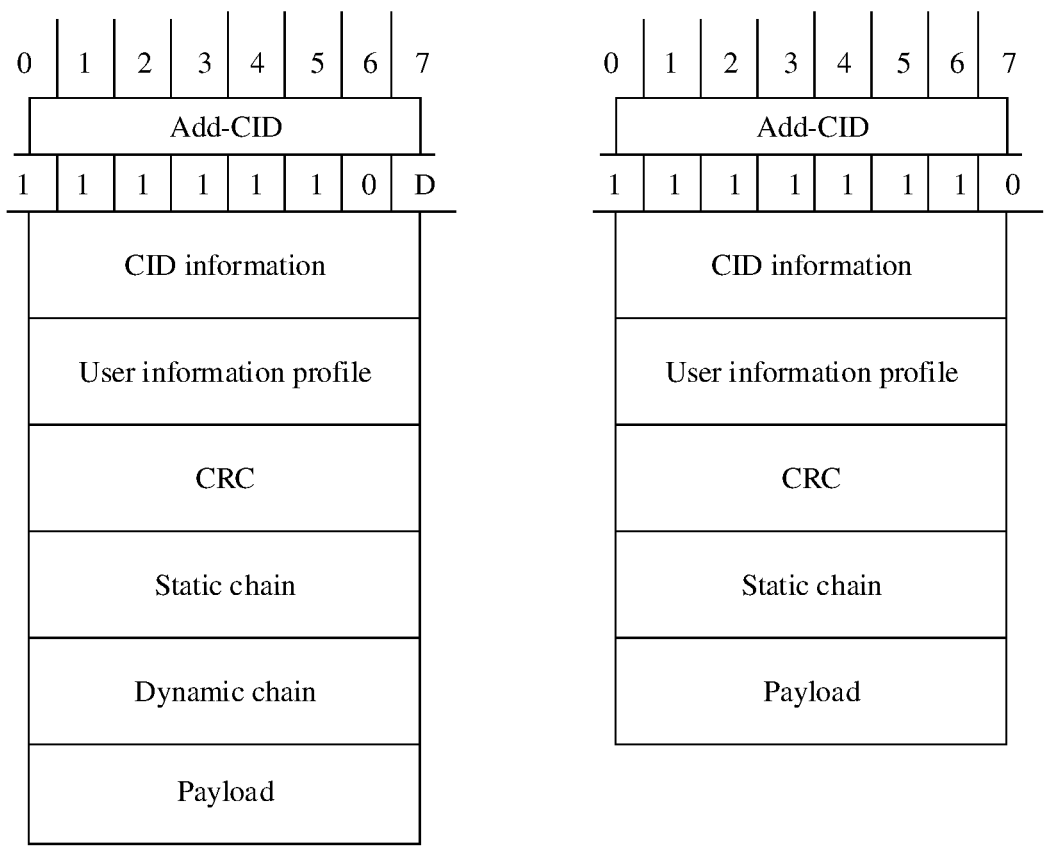
FIG. 7 is a schematic diagram of a packet format in a non-compression order.
Figure 8:
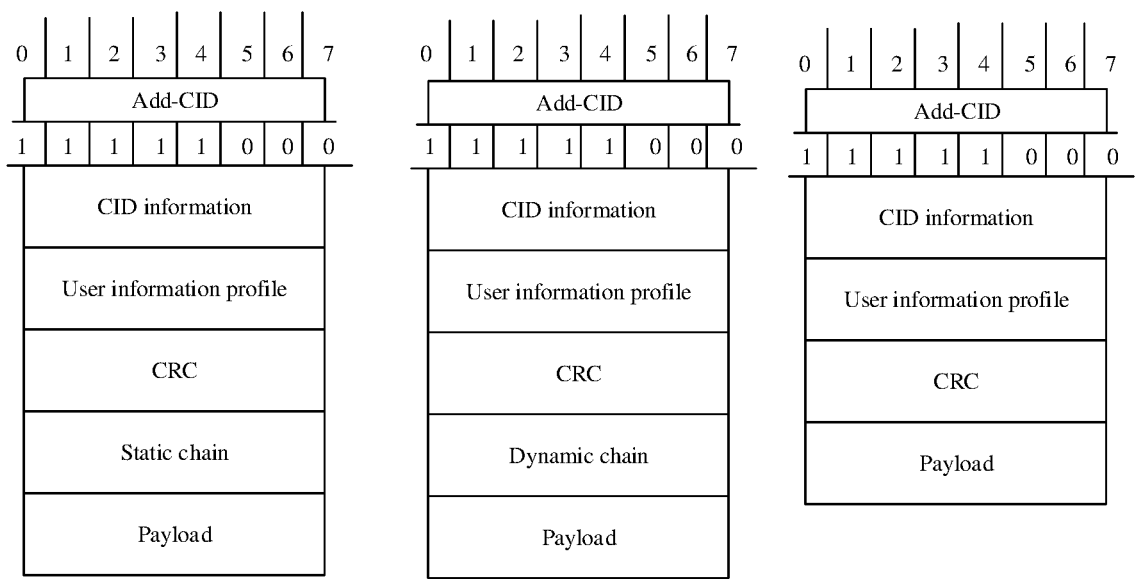
FIG. 8 is a schematic diagram of a packet format in a compression order.

For example, the formats of the packets in different states are shown in FIG. 7 and FIG. 8. It can be seen that the values of the identification bits for the types of the compressed packet are different in FIG. 7 and FIG. 8, so that the two types are distinguished. The format for the non-compression order is shown in FIG. 7, the values of the identification bits may be "1111110D" or "11111110". The format for the packet in the compression order is shown in FIG. 8, the values of the identification bits is "11111000". It can be seen that the packets in different states may be distinguished by the values of the identification bits.

In addition, formats of packets in different states may be distinguished according to different formats, and FIGS. 7 and 8 are still used for illustration. The formats of two packets are shown in FIG. 7, both of which represent a packet in the non-compression order. It may be seen that a dynamic chain and a static chain may be included therein, or only a dynamic chain may be included. In FIG. 8, it can be seen that in the format of packet in the compression order, the static chain and the dynamic chain may not be included, or one of the static chain and the dynamic chain is included.

The formats of the packets in the compression order of part data and the formats of the packets in the compression order may also be different. Referring to FIG. 8, the format of the packets in the compression order of part data may be the left part of the FIG. 8, that is, the static chain is included, and the identification bits of the format are "11111000", or the format may be the middle part, which merely includes the dynamic chain, and the identification bits are "11111000". The format in the compression order of all data may not include the static chain and the dynamic chain, and the format is "11111000".

Alternatively, the different states of packets are distinguished by different identification (i.e., different values of identification bits). For example, the identification of packets in compression order of part data is "11111000", and the identification of packets in compression order of all data is "11111100", and the identification of packets in non-compression order is "11111110".

It should also be understood that the above two definitions for format may be used in combination. For example, there may be difference in format and may also be distinguished by the identification bits. As previously described, details are not described herein.

The compressed packet is delivered downward, and processing of layers such as the PDCP layer and/or the RLC layer is performed.

In operation 44, the compressed packet is transmitted to the base station.

After transmitting N non-compressed Ethernet packets, the UE performs state transformation. The state is transformed to a compression order or a CO (Compression Order) state.

When the UE is in the compression order or the CO state, the UE performs the state migration to the low compression order, i.e., the non-compression order, after the timer timeout.

Figure 9:
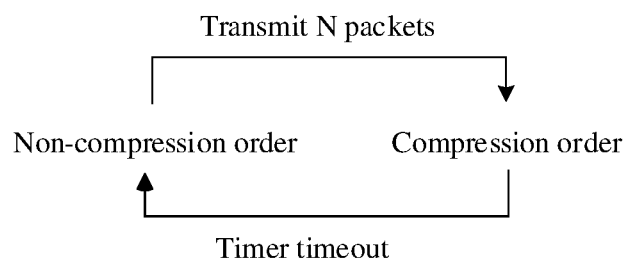
FIG. 9 is a fifth schematic diagram of a state transformation according to embodiments of the present disclosure.

Then, the above operations are cyclically performed. A possible cyclic processing manner may be referred to FIG. 9. For example, when the packet is initially in a non-compression order, transformation to the compression order may be performed after N non-compressed packets are transmitted. Further, a timer may be combined, and when the timer reaches the time length for time out period, transformation to the non-compression order is performed.

According to a certain rule, the compression side and the decompression side migrate between these states to complete the operations of head compression and decompression.

The base station, as decompression side, decompresses the compressed packet, and then delivers the decompressed packet upward, which may include the following operations.

In operation 45, the base station performs a decompression process, which includes the state migration.

Specifically, after receiving the compressed packet from the UE, the base station determines, according to the corresponding rules and mapping relationship, the type of the received packet (whether compressed or not), performs context updating/storage for the non-compressed packet, performs decompression process for the received compressed packet, and performs corresponding state migration.

The specific state transformation may be selected as follows.

The initial decompression state is the no context state.

At the start of the header compression function, or at the initial moment, the base station (decompression side) is in the no context state. After receiving the non-compressed Ethernet packet transmitted by the compression side, the base station performs context updating or storage for the packet according to different paths (context ID, etc.).

After receiving N non-compressed Ethernet packets or successfully receiving/decompressing N non-compressed Ethernet packets, the decompression side performs state migration to a high compression order, i.e., a state in which context is stored, which may be called the full context state or the static context state.

When the decompression side, i.e., the base station, is in a state in which context is stored, which may be called the full context state or the static context state, the base station migrates to a low compression order, i.e., no context state, after timeout.

Then, the above operations are cyclically performed.

In the present scenario, in addition to the description of two states for the compression side, in fact, there may be migration among three states.

For example, after the compression side transmits a plurality of packets in a non-compressed state (IR state), migration to the compression order of part data (FO state) is performed, and after transmitting a plurality of packets in the compression order of part data (FO state), migration to the compression order of all data (SO state) is performed. After the timer time out in the compression order of all data (SO state), returning to the compression order of part data (FO state) is performed, and after the timer time out in the compression order of part data (FO state), returning to the non-compression order (IR state) is performed.

Accordingly, the decompression side may also perform processing for a case of three states.

For example, after receiving multiple successfully decompressed packets in the no context state, migration to the static context state is performed, and after receiving multiple successfully decompressed packets in the static context state, migration to the full context state is performed. When the timer timeout in the full context state, returning to the static context state is performed. When the timer timeout in the static context state, returning to the no context state is performed.

It should be noted that a similar mechanism or different mechanisms may be adopted for transformation between different states. For example, a timer may be adopted for all the transformation. For another example, some transformation adopts a timer mechanism, and some transformation adopts the manner of transmission of multiple packets. There is no limitation.

It should be noted that even if three states are defined, only two of them may be used.

In the Scenario 2, the transmission of the head compression feedback packet (feedback state packet) is supported between the compression side and the decompression side, or, in other words, the state transformation manner based on the feedback is adopted, so that the state migration between the compression side and the decompression side may be performed in a more reliable or efficient manner.

The state migration of Ethernet packet header compression compression side and/or decompression side is based on a feedback-based state migration manner.

The parameters or identification information, format and state carried in the Ethernet packet header format are the same as those described above, and details are not described herein.

Figure 10:
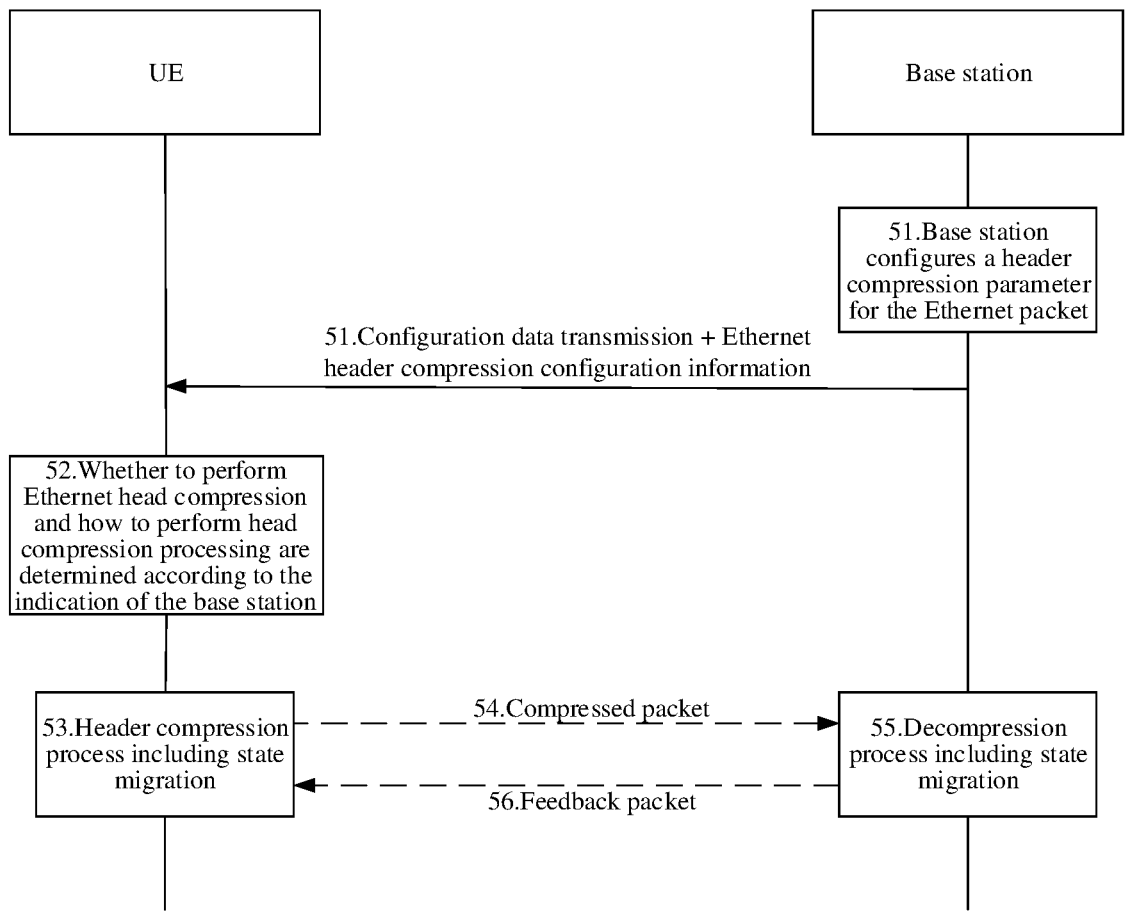
FIG. 10 is a second schematic diagram of a processing flow according to embodiments of the present disclosure.

Hereinafter only the processing for the UL packet will be described. The header compression processing for the downlink packet is similar. As shown in FIG. 10, the process is as follows.

In operation 51, the base station configures a header compression parameter for the Ethernet packet, performs configuration data transmission for the UE, and transmits the Ethernet header compression configuration for the Ethernet packet header. For example, the base station configures a parameter of Ethernet frame header compression by a RRC message.

In operation 52, the UE determines, according to the indication of the base station, whether to perform head compression and how to perform head compression.

Specifically, the UE determines, based on the Ethernet header compression configuration information transmitted by the base station, whether to perform Ethernet header compression, and which sub-header/sub-header type to perform header compression, or the like. For example, header compression may be performed for the source address, target base station, Ethernet type, and T-tags in the Ethernet header. For example, header compression processing may be performed for the static or unchanged portion of an Ethernet header. The specific object or field or field type for header compression may be predefined in the protocol, or may be indicated in the RRC configuration.

In operation 53, the UE performs, based on the above operations, a header compression operation, which includes state migration.

The specific state transformation may be selected as follows.

The initial head compression order is the non-compression order or the IR state.

Figure 11:
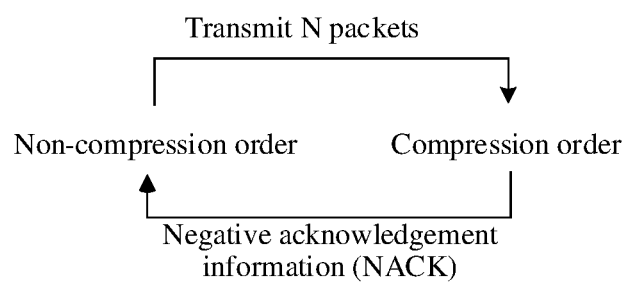
FIG. 11 is a sixth schematic diagram of a state transformation.

A possible state migration diagram is shown in FIG. 11. For example, at the start of the header compression function, or at the initial moment, the UE (compression side) is in the non-compression order or the IR state, and the UE transmits a non-compressed Ethernet packet. After transmitting N non-compressed Ethernet packets, the UE performs the state migration to the compression order or the CO state. In addition, when the UE is in the non-compression or the IR state, the UE transmits N packets in the non-compression order and receives N pieces of acknowledgement information (ACK) fed back by the decompression device, the state migration is performed, for example, migrating to the compression order or the CO state. Accordingly, the decompression side feeds back M pieces of acknowledgement information to the UE after receiving, or successfully receiving, or successfully decompressing M packets in the non-compression order. At the same time, the decompression side migrates to the high state. M is different from N and M may be less than N.

When the UE is in the compression order or the CO state, after receiving the state report transmitted by the decompression side, and the state report indicates the NACK state, or after receiving the NACK decompression states of Y compressed packets, the UE migrates the state to a low compression order, i.e., the non-compression order. In addition, when the UE is in the compression order or the CO state, the UE transmits Y packets in the compression order, and receives L pieces of negative acknowledgement information (NACK) fed back by the decompression device, state migration to a low compression order is performed, for example, migrating to the non-compression order. Accordingly, if the decompression side cannot receive L packets in the compression order or cannot successfully decompress L packets in the compression order, L pieces of negative acknowledgement information (NACK) is fed back to the UE. At the same time, the decompression side migrates to a low state. L may be different form Y, for example L may be less than Y.

Then, the above operations are cyclically performed.

The UE delivers the compressed packets downward, and performs processing of layers such as the PDCP layer and/or the RLC layer.

In operation 54, the compressed packet is transmitted to the base station.

The base station, as decompression side, decompresses the compressed packet, and then delivers the decompressed packet upward.

In operation 55, the base station performs decompression processing, which further includes state migration processing.

In operation 56, the base station transmits a feedback packet to the UE.

Specifically, after receiving the compressed packet from the UE, the base station determines, according to the corresponding rules and mapping relationship, the type of the received packet (whether to be compressed or not), performs context updating/storage on the non-compressed packet, performs decompression processing on the received compressed packet, and performs corresponding state migration.

The specific state transformation may be selected as follows.

The initial decompression state is the no context state.

Figure 12:
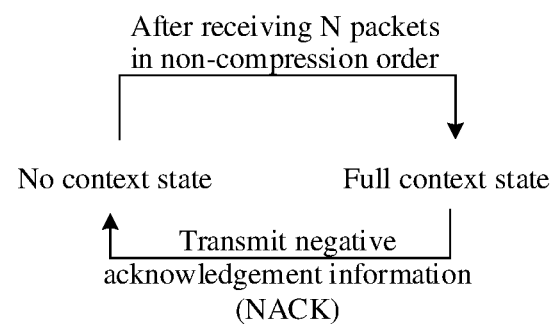
FIG. 12 is a seventh schematic diagram of a state transformation.

For example, referring to FIG. 12, at the start of the header compression function, or at the initial moment, the base station (decompression side) is in the no context state. After receiving the non-compressed Ethernet packet transmitted by the compression side, the base station performs context updating or storage for the packet according to different paths (context ID, etc.).

After receiving N non-compressed Ethernet packets or successfully receiving/decompressing N non-compressed Ethernet packets, the decompression side performs state migration to a high compression order, i.e., a state in which context is stored, which may be called a full context state or a static context state.

When the decompression side, i.e., the base station, is in the state in which context is stored (which may be called a full context state or a static context state), after decompressing the NACK decompression states of Y compressed packets, or transmitting the Ethernet state report and the state report carrying the NACK state, the base station migrates to a low compression order, i.e., the no context state.

Then, the above operations are cyclically performed.

It should also be noted that although the above description is for the two compression orders and the two decompression states, in fact, there may be three states for the compression side, and the migration among three states are as follows.

After transmitting N packets in the non-compression order (IR state), the compression side migrates to the compression order of part data (FO state), and after transmitting N packets in the compression order of part data (FO state), the compression end migrates to the compression order of all data (SO state).

Accordingly, the decompression side may also perform processing for three states For example, after receiving multiple successfully decompressed packets in the no context state, migration to the static context state is performed, and after receiving multiple successfully decompressed packets in the static context state, migration to the full context state is performed. When transmitting first type NACK in the full context state, returning to the static context state is performed. When transmitting first type NACK in the static context state, returning to the no context state is performed.

It should be noted that a similar mechanism or different mechanisms may be adopted for transformation between different states. For example, a timer may be adopted for all the transformation. For another example, some state transformation is performed according to the indication information, and other transformation may be determined according to the received NACK or ACK, which is not exhaustive here.

It can be seen that by adopting the above solutions, when an Ethernet packet is transmitted and received, the packet header is compressed, and the manner for performing compression or decompression currently can be determined according to different states, thereby solving the problem of how to compress Ethernet packet header, and reducing the resource overhead of the air interface.

Figure 13:
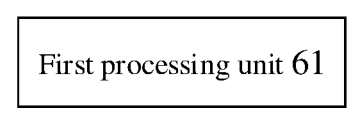

The embodiments of the present disclosure provide a compression side device. As shown in FIG. 13, the compression side device includes a first processing unit.

The first processing unit 61 is configured to determine a state of a to-be-transmitted Ethernet packet header and process, based on the state of the to-be-transmitted Ethernet packet header, data of the to-be-transmitted Ethernet packet header.

The state of the Ethernet packet header includes at least one of the following: a non-compression order and a compression order.

The present embodiment may be applied to a transmitting device, such as a terminal device or a network device, and any one device that needs to perform data transmission may be considered as the transmitting device described in the present embodiment.

The compression order in the present embodiment may include two situations: a compression order and a non-compression order. Alternatively, the compression order may be understood to include an initialization and Refresh (IR) state, i.e., the non-compression order.

Alternatively, the compression order includes at least one of the following: a compression order of part data and a compression order of all data That is, in the present embodiment, there may be two situations: the compression order and the non-compression order. There may also be three situations: the non-compression order, the compression order of part data and the compression order of all data. That is, they may be referred to as IR state, First order (FO), and Second order (SO), respectively. Here, the SO may be the compression order of all data, and the FO may be the compression order of part data.

It should be understood that the device may further include a first communication unit. The first communication unit is configured to transmit the Ethernet packet including the processed Ethernet packet header.

The first processing unit 61 determines the state of the to-be-transmitted Ethernet packet header includes determining whether the state changes, and determining the state of the to-be-transmitted Ethernet packet header.

Specifically, it may include the following operations.

The state of the to-be-transmitted Ethernet packet header is determined based on a first preset rule.

The first preset rule includes at least one of the following.

Performing state transformation between different states is determined based on a period.

Performing state transformation between different states is determined based on a timer.

When N packets of Ethernet packet headers in a same state are transmitted, transformation to another compression order is performed. N is an integer.

When acknowledgement information is received, transformation from a state to another state is performed.

When negative acknowledgement information is received, transformation from a state to another state is performed.

When a specific indication is received, transformation from a state to another state is performed.

That is, the compression order of the currently to-be-transmitted Ethernet packet header may be determined based on the first preset rule.

It should be noted that in the following description, the names of the head compression orders are given from front to back according to the different efficiencies (from low to high) of the head compression, representing the initialization state, the FO, and/or the SO.

The first processing unit 61 is configured to perform at least one of the following operations.

When N packets of the Ethernet packet headers in the non-compression order are transmitted, transformation from the non-compression order to the compression order is performed.

When the N packets of the Ethernet packet header in the non-compression order are transmitted, transformation from the non-compression order to the compression order of part data is performed.

When N packets of Ethernet packet headers in the compression order of part data are transmitted, transformation from the compression order of part data to the compression order of all data is performed.

When the N packets of Ethernet packet headers in the non-compression order are transmitted, transformation from the non-compression order to the compression order of all data is performed.

When N packets of Ethernet packet headers in the compression order are transmitted, transformation from the compression order to non-compression order is performed.

When N packets of Ethernet packet headers in the compression order of all data are transmitted, transformation from the compression order of all data to the non-compression order is performed.

When the N packets of Ethernet packet headers in the compression order of all data are transmitted, transformation from the compression order of all data to the compression order of part data is performed.

When the N packets of Ethernet packet headers in the compression order of part data are transmitted, transformation from the compression order of part data to the non-compression order is performed.

It should be noted that the above-mentioned transmission of N packets in a certain state may be understood as a consecutive transmission of N packets in a certain state or a discontinuous transmission of N packets in a certain state. It is generally to be the consecutive transmission of N packets of a certain state.

That is, when a plurality of packets of a certain state is transmitted, transformation to a next state is performed. When the original state is the non-compression order and there are two states, the next state may be the compression order. When there are three states, the next state may be the compression order of part data or the compression order of all data. Further, when the original state is the compression order, the next state may be a non-compression order. Alternatively, when there are three states and the original state is the compression order of all data, the next state is the compression order of part data or a non-compression order. In the case of the three states, there is another situation in which, when the original state is the compression order of part data, the next state may be the compression order of all data or a non-compression order. Specifically, the next state may be determined according to a preset protocol.

On the basis of the above, in the present embodiment, the manner for determining the state of the currently to-be-transmitted Ethernet packet header may be determining based on the state of the packet header in the at least one Ethernet packet that has been transmitted at present. For example, if the number of packets currently transmitted in one state is less than N, then the currently to-be-transmitted Ethernet packet is still transmitted in this state. If the number is equal to N, then the Ethernet packet header is processed by turning to adopting another state and the Ethernet packet is transmitted.

The first processing unit 61 is configured to perform one of the following operations.

When M pieces of consecutive acknowledgement information are received, or C pieces of acknowledgement information are received, transformation from the non-compression order to the compression order is performed.

When the M pieces of consecutive acknowledgement information are received, or the C pieces of acknowledgement information are received, transformation from the non-compression order to the compression order of part data is performed.

When the M pieces of consecutive acknowledgement information are received, or the C pieces of acknowledgement information are received, transformation from the compression order of part data to the compression order of all data is performed.

When the M pieces of consecutive acknowledgement information are received, or the C pieces of acknowledgement information are received, transformation from the non-compression order to the compression order of all data is performed.

M and C are both integers greater than or equal to 1.

M and C may be same or different. For example, M may be smaller than C. That is, when it is determined that the acknowledgement information is consecutively received, a less number of the pieces of the received information can be used to determine whether to perform the state transformation. When the acknowledgement information is discontinuously received, that is, there may be negative acknowledgement information existed among the acknowledgement information. In such case, more pieces of discontinuous acknowledgement information may be received before whether to perform the state transformation is determined. Of course, vice versa, for example, M may be greater than C, and the specific details may be determined according to the protocol between the two parties.

The first processing unit 61 is configured to perform one of the following operations.

When K pieces of consecutive negative acknowledgement information are received, or L pieces of negative acknowledgement information are received, transformation from the compression order of all data to the compression order of part data is performed.

When the K pieces of consecutive negative acknowledgement information are received, or the L pieces of negative acknowledgement information are received, transformation from the compression order of all data to the non-compression order is performed.

When the K pieces of consecutive negative acknowledgement information are received, or the L pieces of negative acknowledgement information are received, transformation from the compression order of part data to the non-compression order is processed.

When the K pieces of consecutive negative acknowledgement information are received, or the L pieces of negative acknowledgement information are received, transformation from the compression order to the non-compression order is processed.

K and L are integers greater than or equal to 1.

K and L may be same or different.

The first processing unit 61 is configured to perform at least one of the following operations.

When A pieces of negative acknowledgement information of a first type are received, or F pieces of consecutive negative acknowledgement information of the first type are received, transformation from the compression order of all data to the compression order of part data is performed. A and F are integers greater than or equal to 1.

When A pieces of negative acknowledgement information of the first type are received, or F pieces of consecutive negative acknowledgement information of the first type are received, transformation from the compression order of part data to the non-compression order is performed.

When A pieces of negative acknowledgement information of the first type are received, or the F pieces of consecutive negative acknowledgement information of the first type are received, transformation from the compression order to the non-compression order is performed.

When B pieces of negative acknowledgement information of a second type are received, or E pieces of consecutive negative acknowledgement information of the second type are received, transformation from the compression order of all data to the non-compression order is performed.

When the B pieces of negative acknowledgement information of the second type are received, or the E pieces of consecutive negative acknowledgement information of the second type are received, transformation from the compression order of part data to the non-compression order is performed.

When the B pieces of negative acknowledgement information of the second type are received, or E pieces of consecutive negative acknowledgement information of the second type are received, transformation from the compression order to the non-compression order is performed.

When G pieces of negative acknowledgement information of a third type are received, or P pieces of consecutive negative acknowledgement information of the third type are received, transformation from the compression order of all data to the non-compression order is performed. Both G and P are integers.

When the G pieces of negative acknowledgement information of the third type are received, or the P pieces of consecutive negative acknowledgement information of the third type are received, transformation from the compression order of part data to the non-compression order is performed.

When the G pieces of negative acknowledgement information of the third type are received, or the P pieces of consecutive negative acknowledgement information of the third type are received, transformation from the compression order to the non-compression order is performed.

The negative acknowledgement information of the first type, the negative acknowledgement information of the second type and the negative acknowledgement information of the third type are different from each other.

It should be noted here that the above branches may be combined in different situations. That is, the negative acknowledgement information of the first type, the negative acknowledgement information of the second type and the negative acknowledgement information of the third type may be different in different situations.

Figure 14:
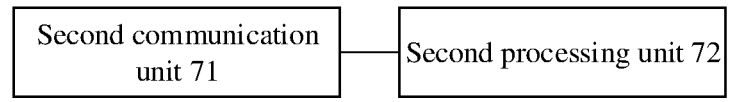
FIG. 14 is a schematic diagram of composition structure of a decompression side device according to embodiments of the present disclosure.

In another embodiment, a decompression side device, referring to FIG. 14, includes a second communication unit 71 and a second processing unit 72.

The second communication unit 71 is configured to receive Ethernet data.

The second processing unit 72 is configured to determine a decompression state, and process data of an Ethernet packet header based on the decompressed state.

The decompression state includes at least one of the following: a no context state and a context state.

The context state includes at least one of the following: a static context state and a full context state.

Here, it should be noted that the decompression state may correspond to the above states, and there may be two or three decompression states. When there are two decompression states, the no context state may be a state that does not need to be decompressed, and the context state may be a state that needs to be decompressed.

In addition, when there are three decompression states, they may include the no context state, the static context state and a full context state. Here, similarly, the no context state may be the state that does not need to be decompressed, the static context state may be a state that part needs to be decompressed, and the full context state may be a state that all needs to be decompressed.

The process of determining the decompression state may include determining whether the state is changed.

The process of determining the decompression state may be performed according to a preset rule. That is, corresponding to the sending end, a second preset rule for decompression corresponding to the compression are provided, which may specifically include the following.

The decompression state is determined based on the second preset rule.

The second preset rule includes at least one of the following.

Performing state transformation between different decompression states is determined based on a period.

Performing state transformation between different decompression states is determined based on a timer.

When H packets in a same decompression state are received or received consecutively, transformation to another decompression state is performed. H is an integer.

When W packets of a first type are received or received consecutively, transformation from a decompression state to another decompression state is performed. W is an integer.

When R packets of a second type are received or received consecutively, transformation from a decompression state to another decompression state is performed. R is an integer, and the first type is different from the second type.

When Q packets of a third type are received or received consecutively, transformation from a decompression state to another decompression state is performed. Q is an integer, and the third type, the first type and the second type are different from each other.

When a migration indication is received, transformation of the decompression state is performed based on the migration indication.

When packet decompression fails in one decompression state, transformation to another decompression state is performed.

When a particular packet or indication is transmitted, performing the state transformation between different decompression states is determined.

Specifically, the operation that performing state transformation between different decompression states is determined based on a period may be that in the process, performing transformation between a plurality of decompression states is determined based on a preset period, so that the state of the currently to-be-used Ethernet packet header may be determined. For example, for two states, referring to FIG. 4, for the no context state and the context state, the no context state is used in a first period and the context state is used in the next period. The decompression state of the currently to-be-used packet may be determined according to the current period. Alternatively, for the three states, the decompression state may also be determined based on the current period.

The operation that performing a state transformation between different decompression states is determined based on the timer is similar to the above. It may be that: same or different timers are set for different states, and when the time length of the timer reaches a corresponding time length, a transformation from one decompression state to another decompression state is performed. For example, after reaching the time length of the timer for the context state, transformation to the no context state is performed, and vice versa. The to-be-transmitted Ethernet packet header is controlled to be in a state, which is a state determined based on a timer currently.

The second processing unit 72 is configured to perform at least one of the following operations.

When H packets in the no context state are received or received consecutively, transformation from the no context state to the context state is performed.

When H packets in the no context state are received or received consecutively, transformation from the context state to the no context state is performed.

When H packets in the no context state are received or received consecutively, transformation from the no context state to the static context state is performed.

When H packets in the no context state are received or received consecutively, transformation from the no context state to the full context state is performed.

When H packets in the static context state are received or received consecutively, transformation from the static context state to the full context state is performed.

When H packets in the full context state are received or received consecutively, transformation from the full context state to the no context state is performed.

When H packets in the full context state are received or received consecutively, transformation from the full context state to the static context state is performed.

When H packets in the static context state are received or received consecutively, transformation from the static context state to the no context state is performed.

It should be noted that the above-mentioned reception of H packets in any state may be understood as a consecutive reception of H packets in a certain decompression state or a discontinuous reception of H packets in the certain decompression state. It is generally to be the consecutive reception of H packets in a certain state.

The second processing unit 72 performs at least one of the following operations.

When W packets of the first type are received or received consecutively, transformation from the no context state to the context state is performed.

When W packets of the first type are received or received consecutively, transformation from the no context state to the static context state is performed.

When W packets of the first type are received or received consecutively, transformation from the no context state to the full context state is performed.

When W packets of the first type are received or received consecutively, transformation from the static context state to the full context state is performed.

And the second processing unit 72 performs one of the following operations.

When R packets of the second type are received or received consecutively, transformation from the context state to the no context state is performed.

When R packets of the second type are received or received consecutively, transformation from the static context state to the no context state is performed.

When R packets of the second type are received or received consecutively, transformation from the full context state to the no context state is performed.

When R packets of the second type are received or received consecutively, transformation from the full context state to the static context state is performed.

In addition, the second processing unit 72 is configured to perform at least one of the following operations.

When Q packets of the third type are received or received consecutively, transformation from the context state to the no context state is performed.

When Q packets of the third type are received or received consecutively, transformation from the static context state to the no context state is performed.

When Q packets of the third type are received or received consecutively, transformation from the static context state to the full context state is performed.

It should be noted that information carried in a format of the Ethernet packet header includes at least one of the following: Ethernet packet frame header compression identification, context identification, frame check sequence (FCS)/identification, indication of whether the header is compressed, sequence number (SN), cyclic redundancy code check (CRC), uncompressed field/sub-header identification, and uncompressed field/sub-header indication.

The format of the Ethernet packet header is: the packet in the compression order and the packets in the non-compression order are in different formats, i.e., independent packet format. That is, different types of packets adopt different packet formats. For example, at least one format of a packet that performs Ethernet packet header compression and a format of packet of non-compressed (containing complete packet information) Ethernet frame are defined, and/or the packets in the compression order and the packet in the non-compression order are in a same format, and values of identification bits of the packets in the compression order being different from values of identification bits of the packets in the non-compression order by at least one bit, That is, the formats of the packets are uniform. The packet in the compression order and the packet in the non-compression order (containing the complete packet information) adopt the same packet format.

For example, the formats of the packets in different state are shown in FIG. 7 and FIG. 8. It can be seen that the values of the identification bits for types of the compressed packet are different in FIG. 7 and FIG. 8, so that the two types are distinguished. The format for the non-compression order is shown in FIG. 7, the values of the identification bits may be "1111110D" or "11111110". The format for the packet in the compression order is shown in FIG. 8, the values of the identification bits is "11111000". It can be seen that the packets in different states may be distinguished by the values of the identification bits.

In addition, formats of packets in different states may be distinguished according to different formats, and FIGS. 7 and 8 are still used for illustration. The formats of two packets are shown in FIG. 7, both of which represent a packet in the non-compression order. It may be seen that a dynamic chain and a static chain may be included therein, or only a dynamic chain may be included. In FIG. 8, it can be seen that in the format of packet in the compression order, the static chain and the dynamic chain may not be included, or one of the static chain and the dynamic chain is included.

The formats of the packets in the compression order of part data and the formats of the packets in the compression order may also be different. Referring to FIG. 8, the format of the packets in the compression order of part data may be the left part of the FIG. 8, that is, the static chain is included, and the identification bits of the format are "11111000", or the format may be the middle part, which merely includes the dynamic chain, and the identification bits are "11111000". The format in the compression order of all data may not include the static chain and the dynamic chain, and the format is "11111000".

It should also be understood that the above two definitions for format may be used in combination. For example, there may be difference in format o and may also be distinguished by the identification bits. As previously described, details are not described herein.

Figure 15:
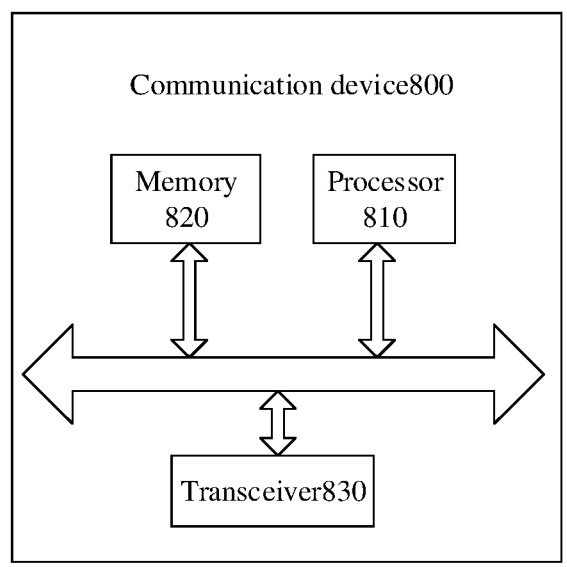
FIG. 15 is a schematic diagram of composition structure of a communication device according to embodiments of the present disclosure.

It can be seen that by adopting the above solutions, when an Ethernet packet is transmitted and received, the packet header is compressed, and the manner for performing compression or decompression currently can be determined according to different states, thereby solving the problem of how to compress Ethernet packet header, and reducing the resource overhead of the air interface FIG. 15 is a schematic structure diagram of a communication device 800 according to embodiments of the present disclosure. The communication device may be a terminal device or a network device according to the embodiments. The communication device 800 shown in FIG. 16 includes a processor 810 that may call and run computer programs from memory to implement the methods in embodiments of the present disclosure.

Alternatively, as shown in FIG. 15, the communication device 800 may also include a memory 820. The processor 810 may call and run computer programs from the memory 820 to implement the method in the embodiments of the present disclosure.

The memory 820 may be a separate device independent of the processor 810, or may be integrated in the processor 810.

Alternatively, as shown in FIG. 15, the communication device 800 may also include a transceiver 830 that may be controlled by the processor 810 to communicate with other devices. Specifically, the transceiver may be controlled to transmit information or data to other devices or receive information or data transmitted by other devices.

The transceiver 830 may include a transmitter and a receiver. The transceiver 830 may further include antenna, and the number of antennas may be one or more.

Alternatively, the communication device 800 may be specifically a compression side device or a decompression side device according to embodiments of the present disclosure, and the communication device 800 may implement a corresponding flow implemented by a mobile terminal/terminal device in various methods according to the embodiments of the present disclosure. For brevity, details are not described herein.

Figure 16:
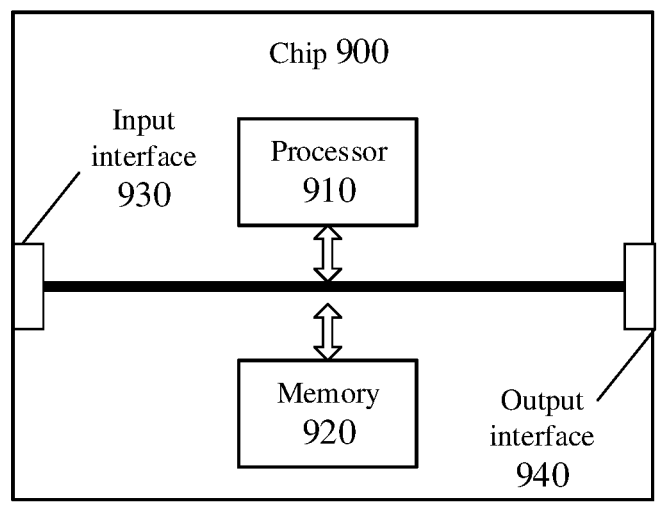
FIG. 16 is a schematic block diagram of a chip according to embodiments of the present disclosure.

FIG. 16 is a schematic block diagram of a chip according to embodiments of the present disclosure. The chip 900 shown in FIG. 16 includes a processor 910 that can call and run computer programs from memory to implement the methods in embodiments of the present disclosure.

Alternatively, as shown in FIG. 16, the chip 900 may also include a memory 920. The processor 910 may call and run computer programs from the memory 920 to implement the method in the embodiments of the present disclosure.

The memory 920 may be a separate device independent of the processor 910, or may be integrated in the processor 910.

Alternatively, the chip 900 may also include an input interface 930. The processor 910 may control the input interface 930 to communicate with other devices or chips, and specifically, may acquire information or data transmitted by other devices or chips.

Alternatively, the chip 900 may also include an output interface 940. The processor 910 may control the output interface 940 to communicate with other devices or chips, and specifically, may output information or data to other devices or chips.

Alternatively, the chip may be applied to a compression side device or a decompression side device in the embodiments of the present disclosure, and the chip may implement a corresponding flow implemented by a network device in each method in the embodiments of the present disclosure. For brevity, details are not described herein.

It should be understood that the chips mentioned in the embodiments of the present disclosure may also be referred to as system-level chips, system chips, chip systems or system-on-chip chips.

Figure 17:
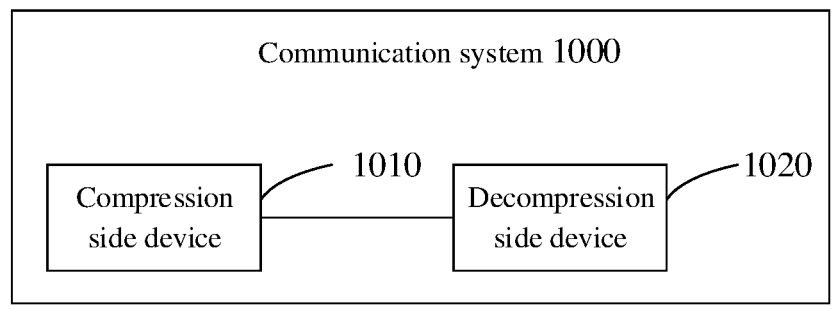
FIG. 17 is a second schematic diagram of a communication system architecture according to embodiments of the present disclosure.

FIG. 17 is a schematic block diagram of a communication system 1000 according to embodiments of the present disclosure. As shown in FIG. 17, the communication system 1000 includes a compression side device 1010 and a decompression side device 1020.

The compression side device 1010 may be used to implement the corresponding functions implemented by the terminal device in the above-described method, and the decompression side device 1020 may be used to implement the corresponding functions implemented by the network device in the above-described method. For brevity, details are not described herein.

It should be understood that the processor of embodiments of the present disclosure may be an integrated circuit chip having signal processing capabilities. In implementation, the operations of the above-described method embodiments may be implemented by integrated logic circuits of hardware in the processor or instructions in the form of software. The processors described above may be general purpose processors, Digital Signal Processor (DSP), Application Specific Integrated Circuit (ASIC), Field Programmable Gate Array (FPGA) or other programmable logic devices, discrete gate or transistor logic devices, discrete hardware components. The methods, operations, and logical block diagrams disclosed in the embodiments of the present application may be implemented or performed. The general purpose processor may be a microprocessor or the processor may be any conventional processor or the like. The operations of the method disclosed in connection with the embodiments of the present disclosure may be directly performed by a hardware decoding processor, or performed by a combination of hardware and software modules in the decoding processor. The software module may be located in a storage medium mature in the art such as a random access memory, a flash memory, a read-only memory, a programmable read-only memory, or an electrically erasable programmable memory, a register, or the like. The storage medium is located in a memory, and the processor reads information in the memory and performs the operations of the above method in conjunction with its hardware.

It should be understood that the memory in embodiments of the present disclosure may be volatile memory or non-volatile memory, or may include both volatile and non-volatile memory. The non-volatile memory may be Read-Only Memory (ROM), Programmable ROM (PROM), Erasable PROM (EPROM), Electrically EPROM (EEPROM), or flash memory. The volatile memory may be a Random Access Memory (RAM), which functions as an external cache. By way of an example, but not a limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It should be noted that the memories of the systems and methods described herein are intended to include, but are not limited to, these and any other suitable types of memories.

It is to be understood that the above memory is exemplary, but not limiting, and that the memory in the embodiments of the present disclosure may also be a static RAM (SRAM), a dynamic RAM (DRAM), a synchronous DRAM (SDRAM), a double data rate SDRAM (double data rate SDRAM, DDR SDRAM), an enhanced SDRAM (ESDRAM), a synch link DRAM (SLDRAM), a Direct Rambus RAM (DR RAM), or the like. That is, the memory in the embodiments of the present disclosure is intended to include, but is not limited to, these and any other suitable types of memory.

The embodiments of the present disclosure further provide a computer readable storage medium for storing computer programs.

Alternatively, the computer readable storage medium may be applied to the network device in the embodiments of the present disclosure, and the computer programs cause the computer to execute the corresponding flow implemented by the network device in the respective methods in the embodiments of the present disclosure. For brevity, details are not described herein.

Alternatively, the computer readable storage medium may be applied to the terminal device in the embodiments of the present disclosure, and the computer programs cause the computer to execute the corresponding flow implemented by the mobile terminal/terminal device in the respective methods in the embodiments of the present disclosure, and details are not described herein for brevity.

The embodiments of the present disclosure further provide a computer program product including computer program instructions.

Alternatively, the computer program product may be applied to the network device in the embodiments of the present disclosure, and the computer program instructions cause the computer to execute the corresponding flow implemented by the network device in the respective methods in the embodiments of the present disclosure. For brevity, details are not described herein.

Alternatively, the computer program product may be applied to the mobile terminal/terminal device in the embodiments of the present disclosure, and the computer program instructions cause the computer to execute the corresponding flows implemented by the mobile terminal/terminal device in the respective methods in the embodiments of the present disclosure. For brevity, details are not described herein.

The embodiments of the disclosure also provide a computer program.

Alternatively, the computer program may be applied to the network device in the embodiments of the present disclosure. When the computer program is run on a computer, the computer is able to execute the corresponding flow implemented by the network device in the respective methods in the embodiments of the present disclosure. For brevity, details are not described herein.

Alternatively, the computer program may be applied to the mobile terminal/terminal device in the embodiments of the present disclosure, and when the computer program is run on a computer, the computer is able to execute the corresponding flow implemented by the mobile terminal/terminal device in the respective methods in the embodiments of the present disclosure. For brevity, details are not described herein.

Those of ordinary skill in the art should recognize that the elements and algorithm steps of the examples described in connection with the embodiments disclosed herein can be implemented in electronic hardware, or a combination of computer software and electronic hardware. Whether these functions are performed in hardware or software depends on the particular application and design constraints of the solution. The skilled artisan may use different methods to implement the described functions for each particular application, but such implementation should not be considered to be outside the scope of the present disclosure.

It should be understood to those skilled in the art that for the convenience and brevity of the description, reference may be made to the corresponding processes in the above method embodiments for the specific working procedures of the above-described systems, apparatuses and units, and details will not be described herein.

In the several embodiments provided herein, it should be understood that the disclosed systems, apparatus, and methods may be implemented in other ways. For example, the device embodiments described above are merely illustrative, for example, the partitioning of the unit is only one logical function partitioning, and may be implemented in another partitioning manner, for example, a plurality of units or components may be combined or integrated into another system, or some features may be ignored or not performed. On the other hand, the coupling or direct coupling or communication connection between each other shown or discussed may be through some interface, indirect coupling or communication connection of a device or unit, and may be in electrical, mechanical or other form.

The elements illustrated as separate elements may or may not be physically separate, and the elements shown as elements may or may not be physical elements, may be located at one location, or may be distributed across multiple network elements. Some or all of the elements may be selected according to actual needs to achieve the objectives of the embodiments.

In addition, the functional units in the various embodiments of the present disclosure may be integrated in one processing unit, may be separate physical units, or may be integrated in two or more units.

The functions, if implemented as software functional units and sold or used as separate products, may be stored in a computer readable storage medium. Based on such an understanding, the technical solutions of the present disclosure may be embodied in the form of a software product, which is stored in a storage medium and includes instructions for causing a computer device (which may be a personal computer, a server, a network device, or the like) to perform all or some of the steps of the methods described in the various embodiments of the present disclosure. The storage medium includes a USB flash drive, a removable hard disk, a Read-Only Memory (Read-Only Memory) ROM, a Random Access Memory (Random Access Memory), a magnetic disk, or an optical disk.

The above description is merely illustrative of the specific embodiments of the present disclosure, but the scope of protection of the present disclosure is not limited thereto. Variations or substitutions may readily occur to those skilled in the art within the technical scope disclosed in the present disclosure, and are intended to be included within the scope of protection of the present application. Accordingly, the scope of protection of the present disclosure shall be as described with reference to the scope of protection of the claims.

The invention claimed is:

1. A method of compression processing, applicable for cellular networks, comprising:
   determining a state of a to-be-transmitted Ethernet packet header; and
   processing, based on the state of the to-be-transmitted Ethernet packet header, data of the to-be-transmitted Ethernet packet header,
   wherein the state of the Ethernet packet header includes: a non-compression order and a compression order, wherein information carried in a format of the Ethernet packet header comprises an Ethernet packet frame header compression identification, a context identification, and a frame check sequence (FCS),
   wherein determining the state of the to-be-transmitted Ethernet packet header includes:
   when acknowledgement information is received, transforming from the non-compression order to the compression order or transforming from the compression order to the non-compression order,
   wherein packets in the compression order and packets in the non-compression order are in different formats,
   wherein a static chain and a dynamic chain are not comprised in formats of the packets in the compression order or one of the static chain and the dynamic chain is comprised in the formats of the packets in the compression order, and a dynamic chain and a static chain are comprised in formats of the packets in the non-compression order.

2. A method of decompression processing, applicable for cellular networks, comprising:
   receiving Ethernet data; and
   determining a decompression state, and processing data of an Ethernet packet header based on the decompressed state,
   wherein the decompression state includes at least one of the following: a no context state and a context state, wherein the no context state is a state that does not need to be decompressed, and the context state is a state that needs to be decompressed,
   wherein information carried in a format of the Ethernet packet header comprises an Ethernet packet frame header compression identification, a context identification, and a frame check sequence (FCS),
   wherein determining the decompression state includes:
   when a migration indication is received, transforming, based on the migration indication, from the no context state to the context state or from the context state to the no context state,
   wherein packets in a compression order and packets in a non-compression order are in different formats,
   wherein a static chain and a dynamic chain are not comprised in formats of the packets in the compression order or one of the static chain and the dynamic chain is comprised in the formats of the packets in the compression order, and a dynamic chain and a static chain are comprised in formats of the packets in the non-compression order.

3. A compression side device, applicable for cellular networks, comprising a processor and a memory for storing computer programs capable of running on the processor,
   wherein the memory is configured to store computer programs, and the processor is configured to call and run the computer programs stored in the memory to:
   determine a state of a to-be-transmitted Ethernet packet header, and process, based on the state of the to-be-transmitted Ethernet packet header, data of the to-be-transmitted Ethernet packet header;
   wherein the state of the Ethernet packet header includes: a non-compression order and a compression order, wherein information carried in a format of the Ethernet packet header comprises an Ethernet packet frame header compression identification, a context identification, and a frame check sequence (FCS),
   wherein the processor is configured to:
   when acknowledgement information is received, transform from the non-compression order to the compression order or transform from the compression order to the non-compression order,
   wherein packets in the compression order and packets in the non-compression order are in different formats,
   wherein a static chain and a dynamic chain are not comprised in formats of the packets in the compression order or one of the static chain and the dynamic chain is comprised in the formats of the packets in the compression order, and a dynamic chain and a static chain are comprised in formats of the packets in the non-compression order.

* * * * *